(12) United States Patent
Yoshida

(10) Patent No.: US 11,090,906 B2
(45) Date of Patent: Aug. 17, 2021

(54) APPARATUS AND MANUFACTURING METHOD THEREOF

(71) Applicant: TIANMA MICROELECTRONICS CO., LTD., Shenzhen (CN)

(72) Inventor: Hitoshi Yoshida, Kanagawa (JP)

(73) Assignee: TIANMA MICROELECTRONICS CO., LTD., Shenzhen (CN)

( * ) Notice: Subject to any disclaimer, the term of this patent is extended or adjusted under 35 U.S.C. 154(b) by 629 days.

(21) Appl. No.: 14/817,532

(22) Filed: Aug. 4, 2015

(65) Prior Publication Data

US 2016/0039179 A1 Feb. 11, 2016

(30) Foreign Application Priority Data

Aug. 5, 2014 (JP) .............................. JP2014-159538
Sep. 22, 2014 (JP) .............................. JP2014-193126

(51) Int. Cl.
  *B32B 7/12* (2006.01)
  *B32B 37/12* (2006.01)
  (Continued)

(52) U.S. Cl.
  CPC ............... *B32B 7/12* (2013.01); *B32B 17/06* (2013.01); *B32B 27/08* (2013.01); *B32B 27/36* (2013.01);
  (Continued)

(58) Field of Classification Search
  CPC ............ B32B 17/06; B32B 2037/1253; B32B 2307/412; B32B 2307/7265;
  (Continued)

(56) References Cited

U.S. PATENT DOCUMENTS 9,140,902 B2   9/2015   Kim et al.
2005/0062925 A1*  3/2005  Kim .................... G02F 1/1339
                                                               349/155
(Continued)

FOREIGN PATENT DOCUMENTS

CN   103189797   7/2013
CN   103681761   3/2014
(Continued)

OTHER PUBLICATIONS

Japanese Office Action issued in Application No. 2014-193126, dated May 15, 2018 with English Translation.
(Continued)

*Primary Examiner* — Alicia J Sawdon
(74) *Attorney, Agent, or Firm* — Nixon & Vanderhye

(57) ABSTRACT

To provide an apparatus such as an image display device with which extrusion of a curing resin from a prescribed place can be prevented and display failure and contamination of surroundings do not occur. A molding member exhibiting liquid repellency is disposed in an outer circumference part of the surface of a cover plate, a light-shielding part, and a base unit to be the laminating surfaces to prevent extrusion of the curing resin used for lamination and to improve generation of display failures and contamination of surroundings which may be caused by assembling failures of the apparatus such as the image display device.

12 Claims, 33 Drawing Sheets

(51) Int. Cl.
  *B32B 27/36*   (2006.01)
  *B32B 27/08*   (2006.01)
  *B32B 17/06*   (2006.01)

(52) U.S. Cl.
  CPC .. *B32B 37/1284* (2013.01); *B32B 2037/1253* (2013.01); *B32B 2307/412* (2013.01); *B32B 2307/7265* (2013.01); *B32B 2398/10* (2013.01); *B32B 2457/20* (2013.01)

(58) Field of Classification Search
  CPC . B32B 2398/10; B32B 2457/20; B32B 27/08; B32B 27/36; B32B 37/1284; B32B 7/12; B32B 3/02; G02F 1/1139; Y10T 428/24777
  USPC .......................................... 264/219; 428/189
  See application file for complete search history.

(56) References Cited

U.S. PATENT DOCUMENTS

| | | | | |
|---|---|---|---|---|
| 2006/0108050 | A1* | 5/2006 | Satake | B32B 3/02 156/101 |
| 2007/0091247 | A1* | 4/2007 | Onda | G02F 1/1341 349/153 |
| 2011/0013125 | A1* | 1/2011 | Lee | G02F 1/1337 349/106 |
| 2011/0134378 | A1* | 6/2011 | Tsuboi | G02F 1/1335 349/110 |
| 2011/0151202 | A1 | 6/2011 | Feinstein et al. | |
| 2013/0093697 | A1* | 4/2013 | Sun | G06F 3/0412 345/173 |
| 2014/0078585 | A1* | 3/2014 | Kim | G09F 9/33 359/513 |
| 2015/0062512 | A1* | 3/2015 | Park | G02F 1/1337 349/123 |
| 2016/0202515 | A1* | 7/2016 | Watanabe | G02F 1/1339 349/153 |

FOREIGN PATENT DOCUMENTS

| | | | |
|---|---|---|---|
| JP | 2008-281997 A | 11/2008 | |
| JP | 2013-015740 A | 1/2013 | |
| JP | 2013-088455 | 5/2013 | |
| JP | 2014-182163 A | 9/2014 | |
| JP | 2014-223759 A | 12/2014 | |
| JP | 2015-200724 A | 11/2015 | |
| WO | 2007066590 | 6/2007 | |
| WO | 2011/158840 A1 | 12/2011 | |
| WO | WO-2012115157 A1 * | 8/2012 | ........... C09D 183/04 |
| WO | WO-2015029704 A1 * | 3/2015 | ........... G02F 1/1339 |

OTHER PUBLICATIONS

Chinese Office Action for Application No. 201510475595.0, dated Jan. 11, 2019, with English translation provided.

* cited by examiner

FIG. 10A SHAPE(1)
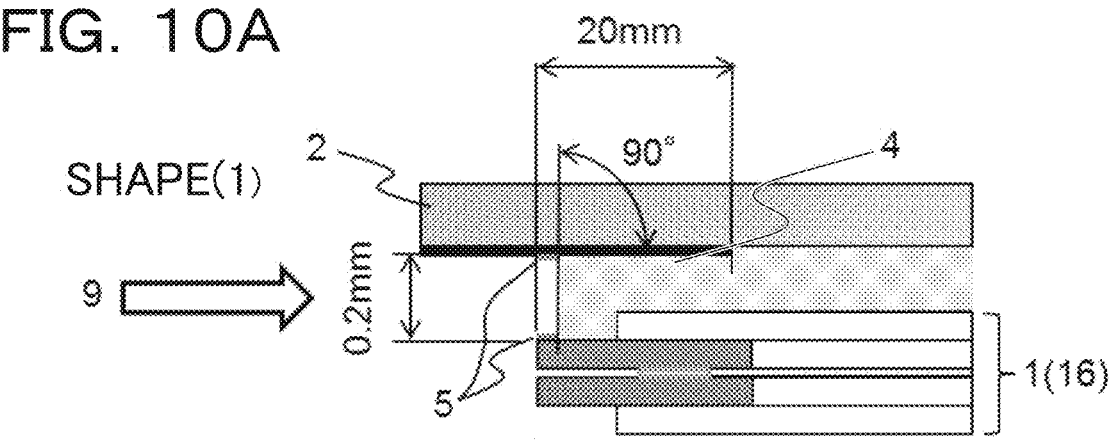
FIG. 10B SHAPE(2)
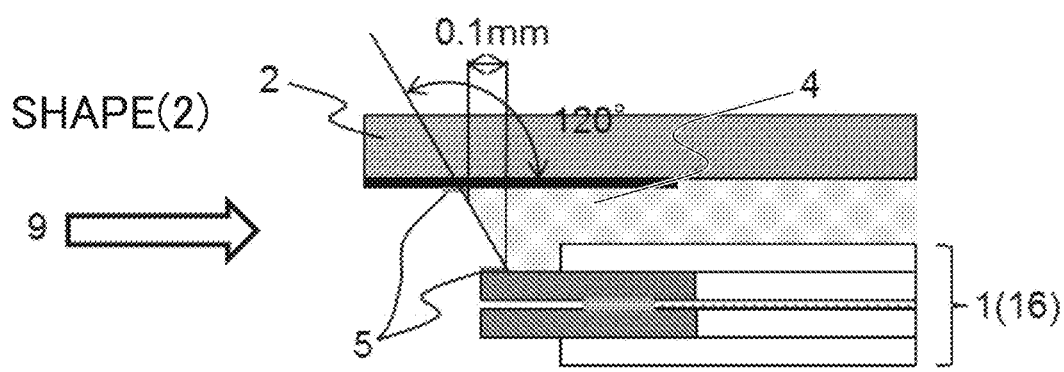
FIG. 10C SHAPE(3)
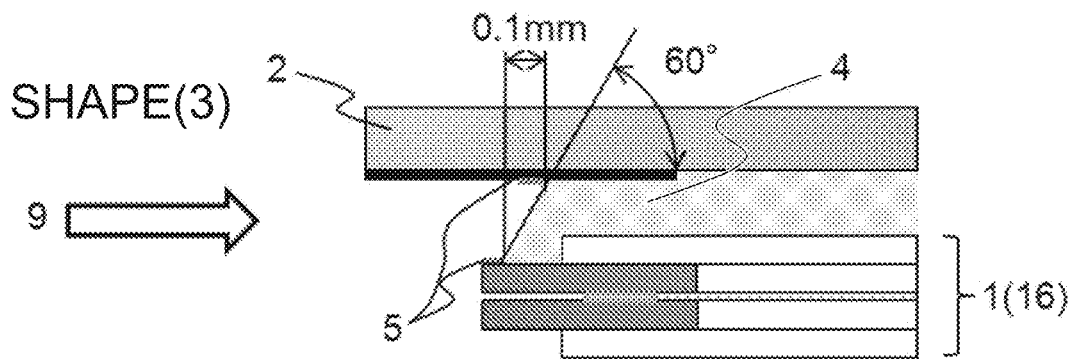
FIG. 10D SHAPE(4)
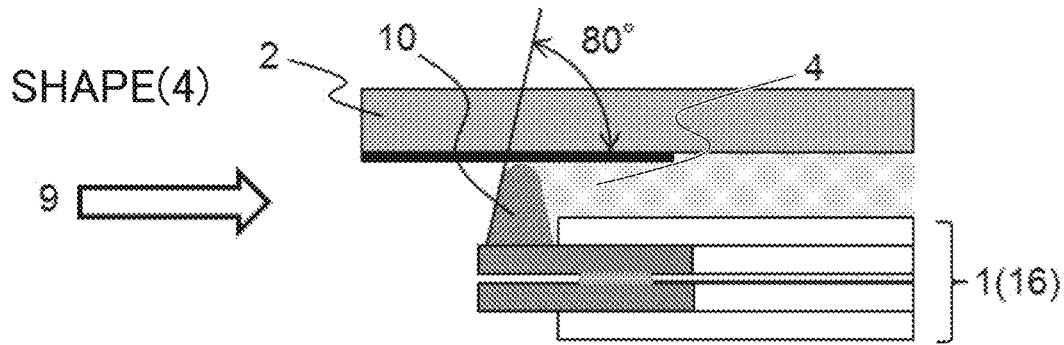

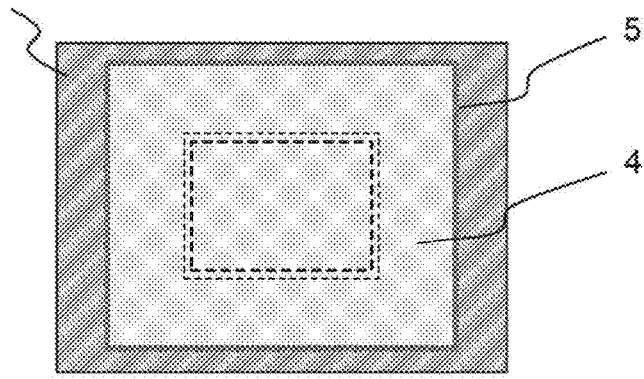
FIG. 11A SHAPE(1)
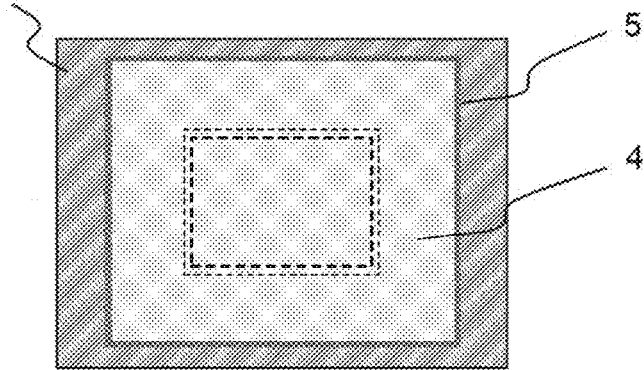
FIG. 11B SHAPE(2)
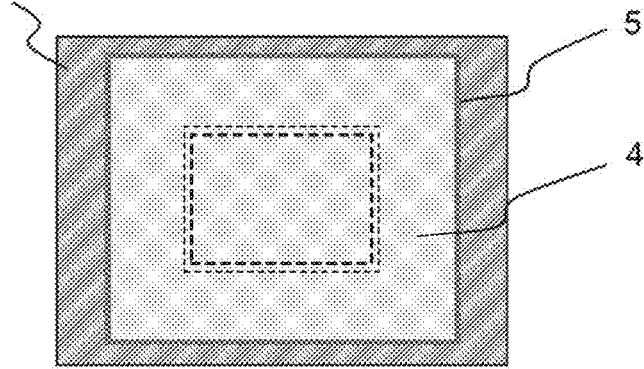
FIG. 11C SHAPE(3)
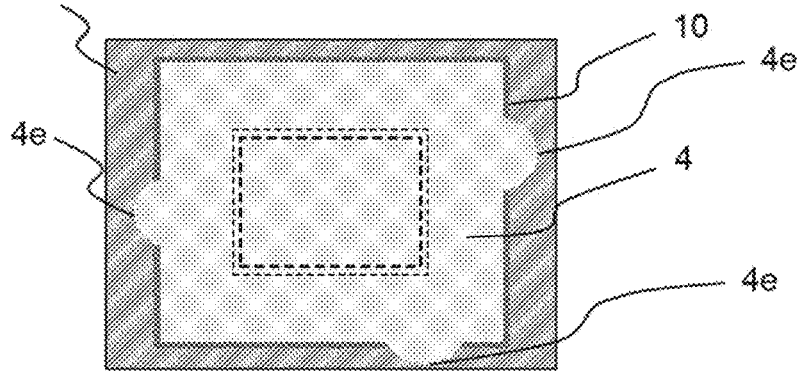
FIG. 11D SHAPE(4)

FIG. 13A1
WHEN CURING RESIN IS APPLIED
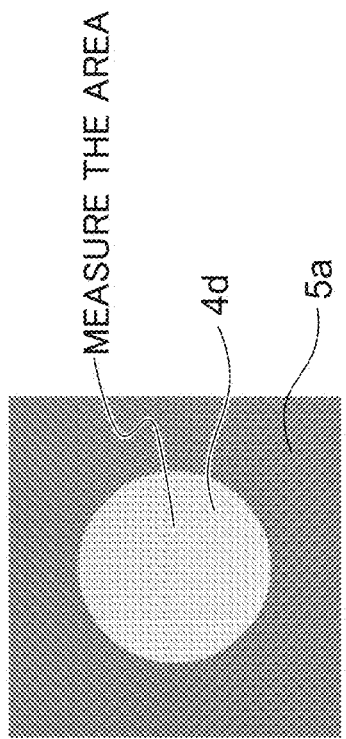
FIG. 13B1
SPREAD OF WET
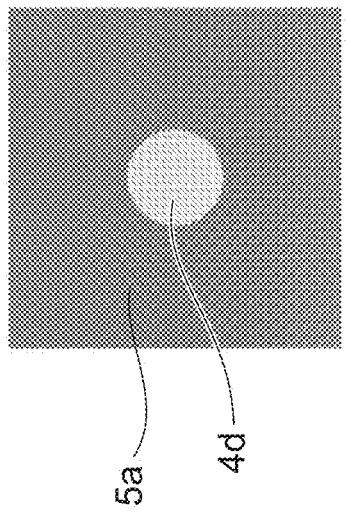
MEASURE THE AREA
FIG. 13A2
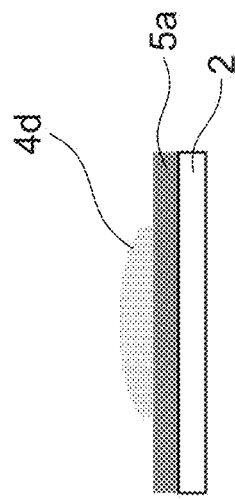
APPLY
FIG. 13B2
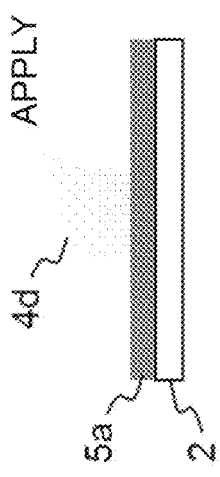

MOLDING MEMBER FORMING STEP
(APPLYING, CURING APPARATUS)

CURING RESIN APPLYING/LAMINATING STEP
(APPLYING, POSITIONING, LAMINATING APPARATUS)

GAP CURING STEP
(UV CURING APPARATUS)

TRANSPARENT REGION CURING STEP
(UV CURING CONVEYOR APPARATUS)

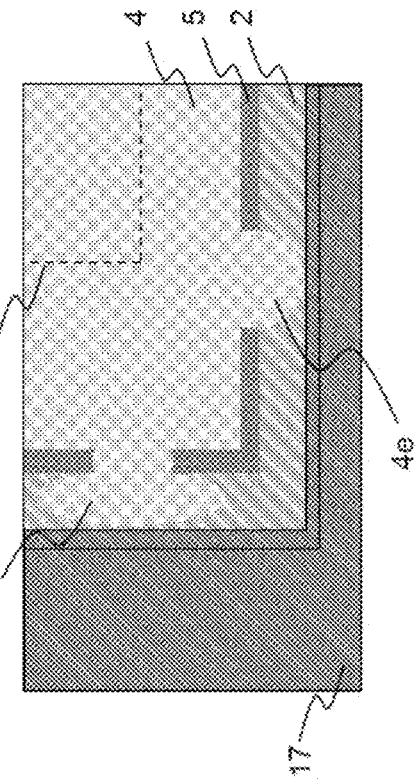
FIG. 15A1
EMBODIMENT
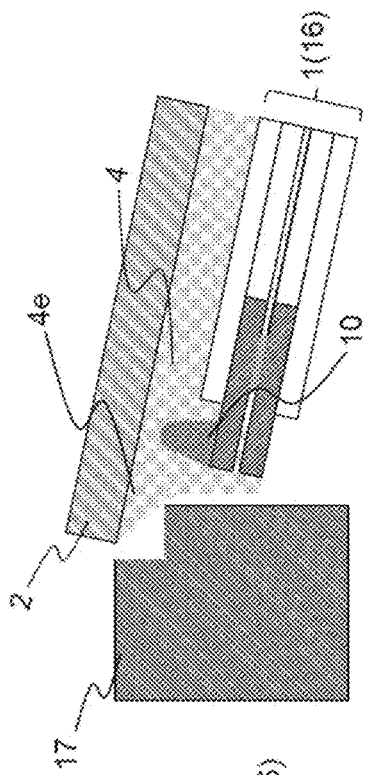
FIG. 15B1
CASE OF USING BEAD-LIKE DAM MATERIALS
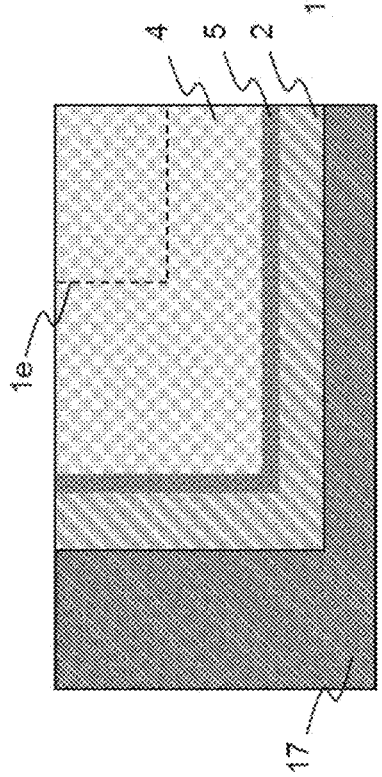
FIG. 15A2
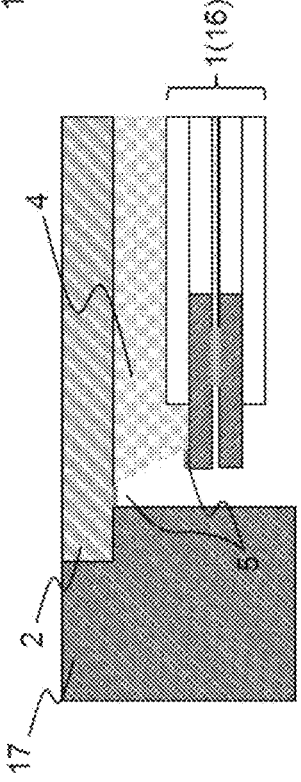
FIG. 15B2

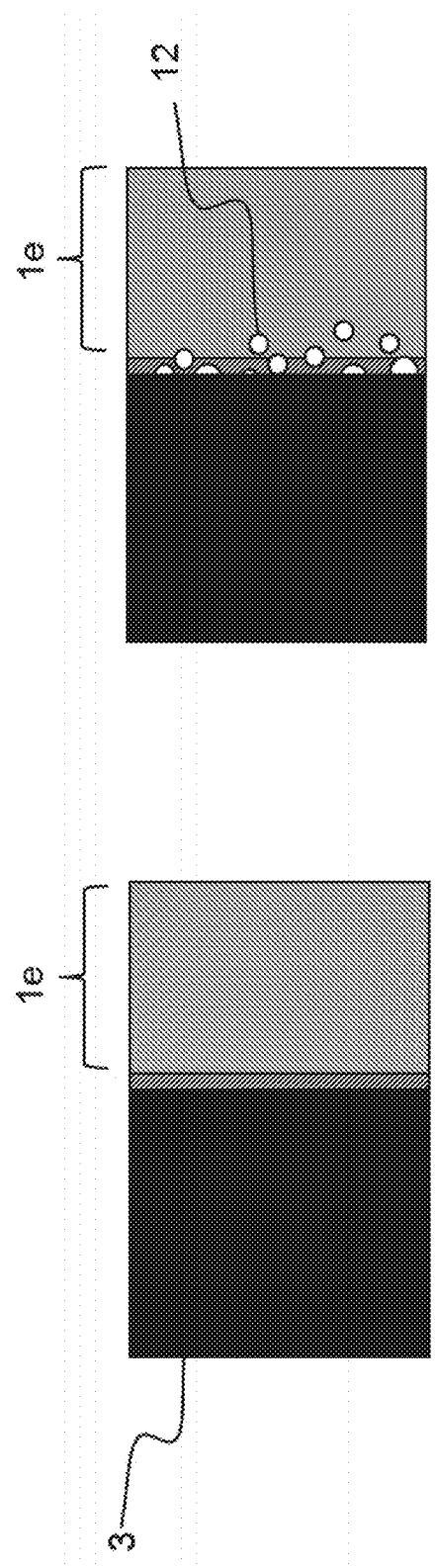
FIG. 16A1
EMBODIMENT
FIG. 16B1
CASE OF USING BEAD-LIKE DAM MATERIALS
FIG. 16A2
FIG. 16B2

FIG. 19A  CURING RESIN APPLYING/LAMINATING STEP
(APPLYING, POSITIONING, LAMINATING APPARATUS)
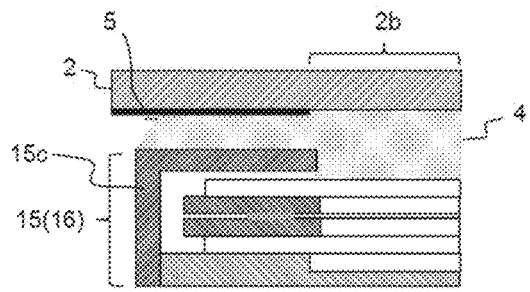
FIG. 19B
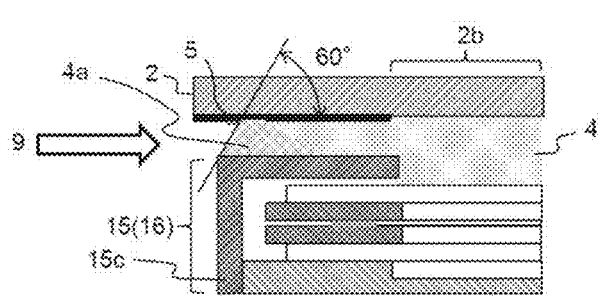
GAP END CURING STEP
(UV CURING APPARATUS)
FIG. 19C
TRANSPARENT REGION
CURING STEP
(UV CURING CONVEYOR APPARATUS)
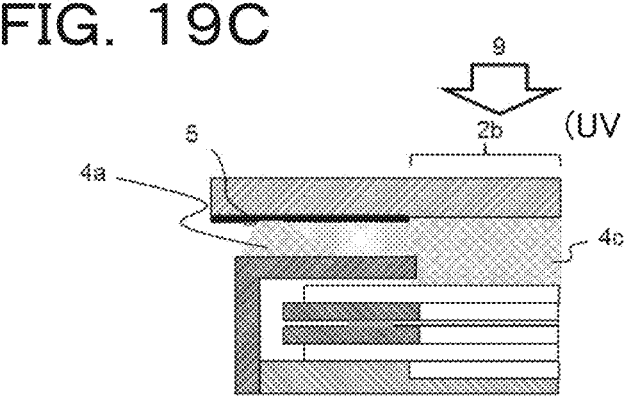
FIG. 19D
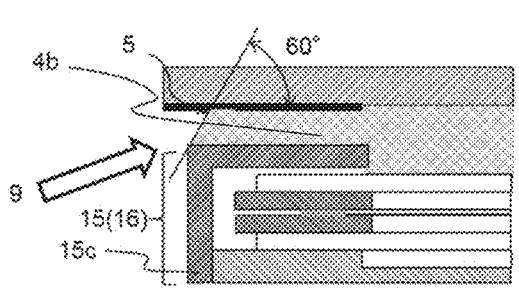
GAP DEPTH CURING STEP
(UV CURING APPARATUS)

EMBODIMENT

CASE OF USING BEAD-LIKE DAM MATERIALS

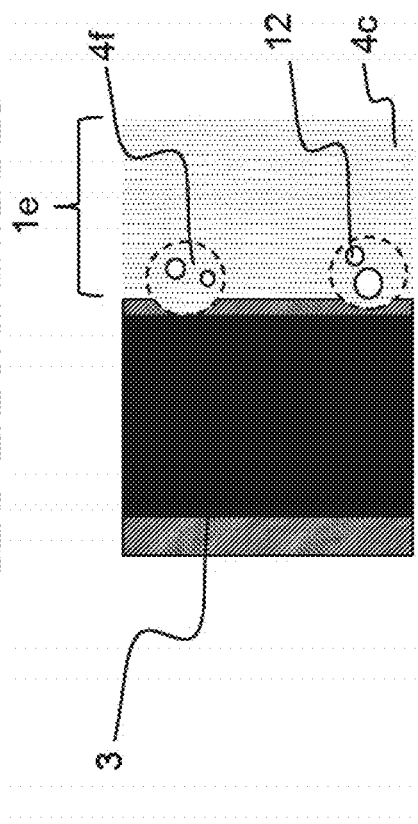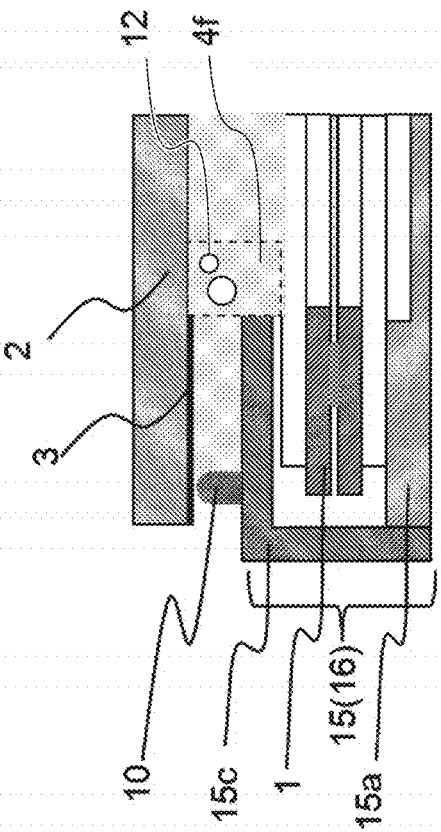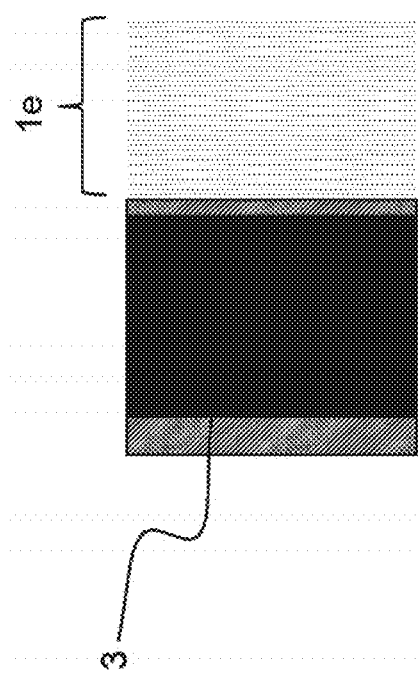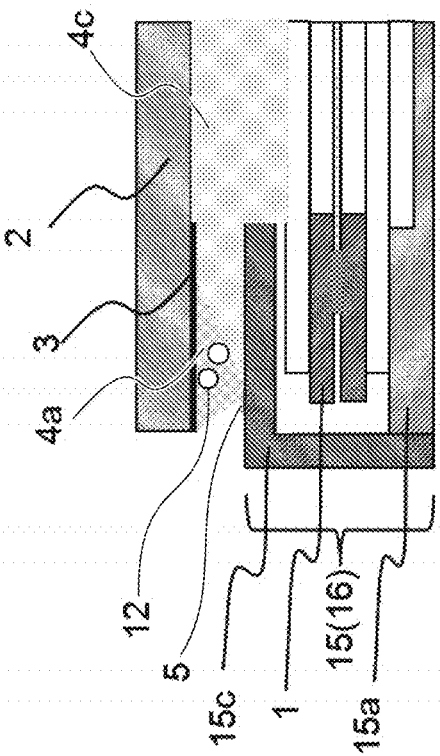

(Prior Art)

(Prior Art)

US 11,090,906 B2

APPARATUS AND MANUFACTURING METHOD THEREOF

CROSS-REFERENCE TO RELATED APPLICATION

This application is based upon and claims the benefit of priority from Japanese patent application No. 2014-159538, filed on Aug. 5, 2014 and Japanese patent application No. 2014-193126, filed on Sep. 22, 2014, the disclosure of which is incorporated herein in its entirety by reference.

BACKGROUND OF THE INVENTION

1. Field of the Invention

The present invention relates to an apparatus and an apparatus manufacturing method.

2. Description of the Related Art

In the image display sections of mobile phones, smartphones, touch panels, and the like, an air gap is provided between an image display device such as a liquid crystal module and a transparent cover plate (glass, reinforced glass, an acryl plate, a PET plate, a composite plate thereof, etc.) provided on the uppermost part thereof in order to prevent display failures caused by exfoliation of the cover plate due to a separating force that is generated by a stress applied from outside and caused when the stress applied from outside is transmitted to the image display sections. This kind of structure is called an air gap structure in general. Recently, in order to improve the visibility and the adhesive characteristic of the image display device, a structure in which a photocurable optical elastic resin is used to glue the cover plate to the image display device is used in some cases. Further, for apparatuses (car navigation systems, tablet terminals, etc.) for which the design and decoration of the image display device are required, cover plates decorated by printings or the like are used. The screens of such apparatuses tend to become large-sized.

As the methods for laminating the cover plate and the image display device via the whole surfaces by using a photocurable resin, already known are a display apparatus manufacturing method disclosed in WO 2007/066590 (Patent Document 1) and an image display device manufacturing method disclosed in Japanese Unexamined Patent Publication 2013-88455 (Patent Document 2).

The basic structural example of the device disclosed in Patent Document 1 is shown in FIG. 32. The device disclosed in Patent Document 1 is constituted with: a base unit 16 formed with an image display device that is constituted with a TFT substrate 54, a CF substrate (color filter substrate) 53, phase difference correction films 55, 57, polarization plates 56, 58, and a driver IC 60; a transparent cover plate 51; a light-shielding printed part 52 that is integrally formed with the transparent cover plate 51 by printing black ink exhibiting a light-shielding characteristic in the outer circumference of the display region on the back face of the transparent cover plate 51; and a transparent photocurable resin 59 for laminating the transparent cover plate 51 and the image display device via the whole surfaces.

The thickness of the photocurable resin 59 is within a range of 30 μm to 200 μm, and its projection from the outer circumference of the image display device is about within 0.3 mm Light for curing cannot be irradiated from the above the transparent cover plate 51 and from the bottom of the image display device in the part sandwiched between the light-shielding printed part 52 and the image display device (based unit 16). Thus, light is irradiated from the side of the outer circumference of the transparent cover plate 51 to cure the photocurable resin 59 in such a manner that the curing rate becomes 70% or higher.

Next, the basic structural example of the device disclosed in Patent Document 2 is shown in FIG. 33. The device disclosed in Patent Document 2 is constituted with: a base unit 16 formed with an image display device 100 that is constituted with a flat panel display 108, a backlight 109, and a bezel 112; a transparent cover plate 103; a light-shielding printed part 104 that is integrally formed with the transparent cover plate 103 by printing black ink exhibiting a light-shielding characteristic in the outer circumference of the display region on the back face of the transparent cover plate 103; a dam part 105 provided in the outer fringe of the transparent cover plate 103; and a transparent photocurable resin 106 for laminating the whole surfaces of the transparent cover plate 103 and the flat panel display 108.

The dam part 105 is formed by applying in advance a dam material (resin) on the transparent cover plate 103 for 150 μm in height and 1 mm in width in a bead-like form and curing it by light.

If the amount of the curing resin 59 applied for laminating the cover plate 51 and the image display device is too much in a case where the technique disclosed in Patent Document 1 is employed, the curing resin 59 may be extruded out from the external shape of the image display device and contaminate the periphery of the image display device or the external size of the image display device may be expanded so that assembling failure of the apparatus may occur in some cases.

Further, similar inconveniences occur in a case where the gap between the cover plate 51 and the image display device is narrowed.

In a case where the technique disclosed in Patent Document 2 is employed, the dam part 105 dams up the photocurable resin 106. Thus, there is a gap generated between the dam part 105 provided in the transparent cover plate 103 and the flat panel display 108 due to warping of the transparent cover plate 103 and the flat panel display 108, so that the photocurable resin 106 may be extruded out from the gap and may cause a problem similar to the above case.

It is therefore an exemplary object of the present invention to provide an apparatus such as a display device with which the curable resin is prevented from being extruded out from a prescribed place and display failures do not occur due to surrounding contamination and assembling failure and to provide a manufacturing method thereof.

SUMMARY OF THE INVENTION

In an apparatus such as a display device in which a base unit having an image display region and a cover plate are laminated via whole surfaces thereof by a curing resin interposed therebetween, a molding member for restricting a spread region of the curing resin in a gap sandwiched between the base unit and the cover plate is provided at least in one of opposing surfaces of the base unit and the cover plate.

Further, in an apparatus such as a display device in which a base unit having an image display region and a cover plate are laminated via whole surfaces thereof by a curing resin interposed therebetween, a molding member for molding an end part sectional shape of the curing resin in a gap sandwiched between the base unit and the cover plate is provided at least in one of opposing surfaces of the base unit and the cover plate.

As an exemplary advantage according to the invention, the cover plate and the base unit are not easily separated from the curing resin provided between the gap thereof, and extrusion of the curing resin can be prevented. As a result, the problem related to display failures caused due to assembling failures in the apparatus such as the display device and related to occurrence of surrounding contamination inside the apparatus can be improved.

BRIEF DESCRIPTION OF THE DRAWINGS

FIGS. 1A and 1B show a structural example of an apparatus according to an exemplary embodiment that uses a liquid crystal panel as a kind of an image display device for a base unit, in which FIG. 1A is a plan view thereof and FIG. 1B is a side elevational section thereof (a first exemplary embodiment);

FIGS. 3A and 3B show the sectional shapes of the end part of an uncured state curing resin in the apparatus of the exemplary embodiment that uses the liquid crystal panel as a kind of an image display device for the base unit, in which FIG. 3A shows the shape of the side elevational section when the volume of the curing resin is relatively large and FIG. 3B shows the shape of the side elevational section when the volume of the curing resin is relatively small (the first exemplary embodiment);

FIGS. 10A-10D show examples of the sectional shape of the end part of a curing resin changed by using a molding member, in which FIG. 10A is a case where the molding member of the cover plate side and the molding member of the liquid crystal panel side are disposed in such a manner that the both molding members overlap with each other when viewed from the normal directions of the surfaces of the cover plate and the liquid crystal panel so that the outer circumferential end face of the curing resin comes to be at an right angle with respect to the surfaces of the cover plate and the liquid crystal panel, FIG. 10B is a case where the position of the molding member of the cover plate is shifted to the outer circumference side of the cover plate with respect to the position of the molding member of the liquid crystal panel side so that the outer circumferential end part of the curing resin comes to be in a tapered shape which expands gradually towards outside as becoming isolated from the liquid crystal panel, FIG. 10C is a case where the position of the molding member of the cover plate is shifted to the inner circumference side of the cover plate with respect to the position of the molding member of the liquid crystal panel side so that the outer circumferential end part of the curing resin comes to be in a tapered shape which expands gradually towards outside as becoming isolated from the liquid crystal panel, and FIG. 10D is a case where a bead-like dam material for preventing extrusion of the curing resin is formed on the liquid crystal panel (the first exemplary embodiment and a comparative example);

FIGS. 11A-11D show plan views of the extrusion state of the curing resin which laminates the base unit and the cover plate, in which FIG. 11A is the extrusion state of the curing resin in a case where the molding member of the cover plate side and the molding member of the liquid crystal panel side are disposed in such a manner that the both molding members overlap with each other when viewed from the normal directions of the surfaces of the cover plate and the liquid crystal panel so that the outer circumferential end face of the curing resin comes to be at an right angle with respect to the surfaces of the cover plate and the liquid crystal panel, FIG. 11B is the extrusion state of the curing resin in a case where the position of the molding member of the cover plate is shifted to the outer circumference side of the cover plate with respect to the position of the molding member of the liquid crystal panel side so that the outer circumferential end part of the curing resin comes to be in a tapered shape which expands gradually towards outside as becoming isolated from the liquid crystal panel, FIG. 11C is the extrusion state of the curing resin in a case where the position of the molding member of the cover plate is shifted to the inner circumference side of the cover plate with respect to the position of the molding member of the liquid crystal panel side so that the outer circumferential end part of the curing resin comes to be in a tapered shape which expands gradually towards outside as becoming isolated from the liquid crystal panel, and FIG. 11D is the extrusion state of the curing resin in a case where a bead-like dam material for preventing extrusion of the curing resin is formed on the liquid crystal panel (the first exemplary embodiment and a comparative example);

FIGS. 13A1-13B2 show simplified illustrations of an experiment device and sample examples used when checking changes in the wet area, in which FIG. 13A1 is a plan view showing the experiment device and the state of the sample at the point when the experiment is started, FIG. 13A2 is a side elevational view showing the experiment device and the state of the sample at the point when the experiment is started, FIG. 13B1 is a plan view showing the experiment device and the state of the sample at the point where a prescribed time has passed from the start of the experiment, and FIG. 13B2 is a side elevational view showing the experiment device and the state of the sample at the point where a prescribed time has passed from the start of the experiment;

FIGS. 14A-14D show step explanatory charts regarding the outline of the manufacturing steps when an apparatus manufacturing method of the present invention is employed for the apparatus constituted with a base unit using a liquid crystal panel and a cover plate having a light-shielding part, in which FIG. 14A is a side elevational section showing a step of forming a molding member to the liquid crystal panel and the cover plate in a simplified manner, FIG. 14B is a side elevational section showing a step of laminating the liquid crystal panel and the cover plate in a simplified manner, FIG. 14C is a side elevational section showing a step of curing a curing resin placed in a gap between the cover plate and a light-shielding region of the liquid crystal panel in a simplified manner, and FIG. 14D is a side elevational section showing a step of curing a curing resin placed in a gap between the cover plate and a transparent region of the liquid crystal panel in a simplified manner (the first exemplary embodiment);

FIGS. 15A1-15B2 show simplified illustrations regarding the states when the laminated base unit and the cover plate are mounted into a chassis, in which FIG. 15A1 is a plan view showing a proper mounted state of the base unit and the cover plate to which the manufacturing method of the exemplary embodiment is employed, FIG. 15A2 is a side elevational section showing a proper mounted state of the base unit and the cover plate to which the manufacturing method of the exemplary embodiment is employed, FIG. 15B1 is a plan view showing an improper mounted state of the base unit and the cover plate generated when a manufacturing method using a dam material is employed, and FIG. 15B2 is a side elevational section showing an improper mounted state of the base unit and the cover plate generated when a manufacturing method using a dam material is employed;

FIGS. 16A1-16B2 shows simplified illustrations regarding the states where an external force in the direction of separating the cover plate laminated to the base unit therefrom is applied, in which FIG. 16A1 is a plan view showing a state where an external force is applied when the base unit and the cover plate to which the manufacturing method of the exemplary embodiment is employed are laminated properly by a curing resin, FIG. 16A2 is a side elevational section a state where an external force is applied when the base unit and the cover plate to which the manufacturing method of the exemplary embodiment is employed are laminated properly by a curing resin, FIG. 16B1 is a plan view showing a state where an external force is applied when the base unit and the cover plate to which the manufacturing method using a dam material is employed are laminated improperly, and FIG. 16B2 is a side elevational section a state where an external force is applied when the base unit and the cover plate to which the manufacturing method using a dam material is employed are laminated improperly;

FIGS. 17A and 17B show a structural example of an apparatus according to an exemplary embodiment that uses an LCD module as a kind of an image display device for a base unit, in which FIG. 17A is a plan view thereof and FIG. 17B is a side elevational section thereof (a second exemplary embodiment);

FIGS. 19A-19D show step explanatory charts regarding the steps of curing a curing resin in a gap between the cover plate and the LCD module, in which FIG. 19A is a side elevational section showing a laminating state of the cover plate and an LCD module in a simplified manner, FIG. 19B is a side elevational section showing a step of curing only the curing resin placed in the region of the end part between the cover plate and the LCD module in a simplified manner, FIG. 19C is a side elevational section showing a step of curing the curing resin placed under a transparent region of the cover plate in a simplified manner, and FIG. 19D is a side elevational section showing a step of curing the curing resin placed in the depth region between the cover plate and the LCD module in a simplified manner (the second exemplary embodiment);

FIGS. 30A and 30B show simplified illustrations regarding the states when the laminated base unit and the cover plate are mounted into a chassis, in which FIG. 30A is a side elevational section showing a proper mounted state of the base unit and the cover plate to which the manufacturing method of the exemplary embodiment is employed and FIG. 30B is a side elevational section showing an improper mounted state of the base unit and the cover plate generated when a manufacturing method using a dam material is employed;

FIGS. 31A1-31B2 simplified illustrations regarding the states when the laminated base unit and the cover plate are laminated, in which FIG. 31A1 is a plan view showing a proper mounted state of the base unit and the cover plate to which the manufacturing method of the exemplary embodiment is employed, FIG. 31A2 is a side elevational section showing a proper mounted state of the base unit and the cover plate to which the manufacturing method of the exemplary embodiment is employed, FIG. 31B1 is a plan view showing an improper mounted state of the base unit and the cover plate generated when a manufacturing method using a dam material is employed, and FIG. 31B2 is a side elevational section showing an improper mounted state of the base unit and the cover plate generated when a manufacturing method using a dam material is employed;

DETAILED DESCRIPTION OF THE PREFERRED EMBODIMENTS (Structure of First Exemplary Embodiment)

The structures of a first exemplary embodiment to which the present invention is applied will be described by referring to FIGS. 1A and 1B.

Figure 1A:
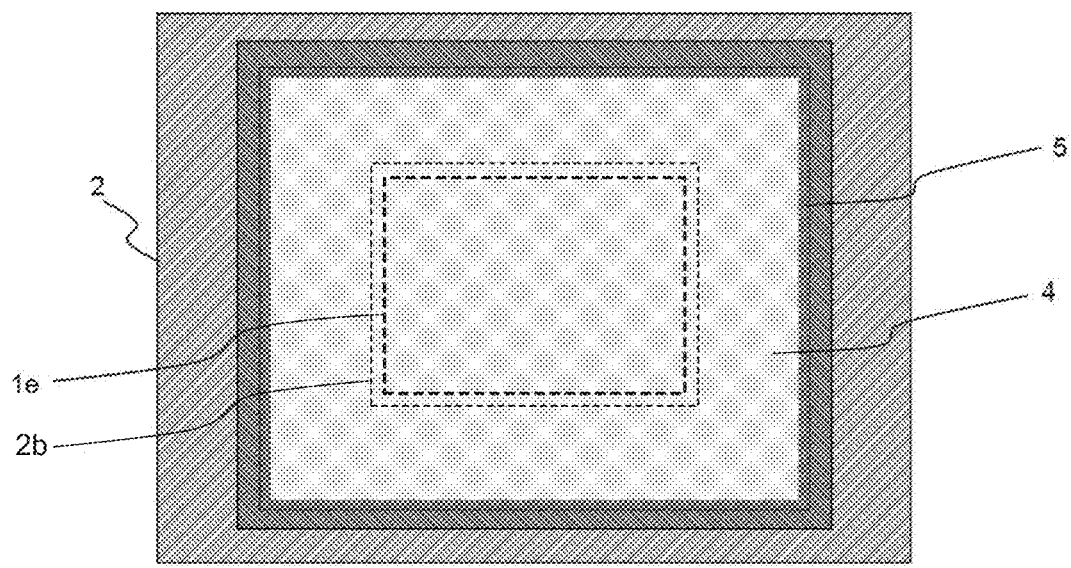
Figure 1B:
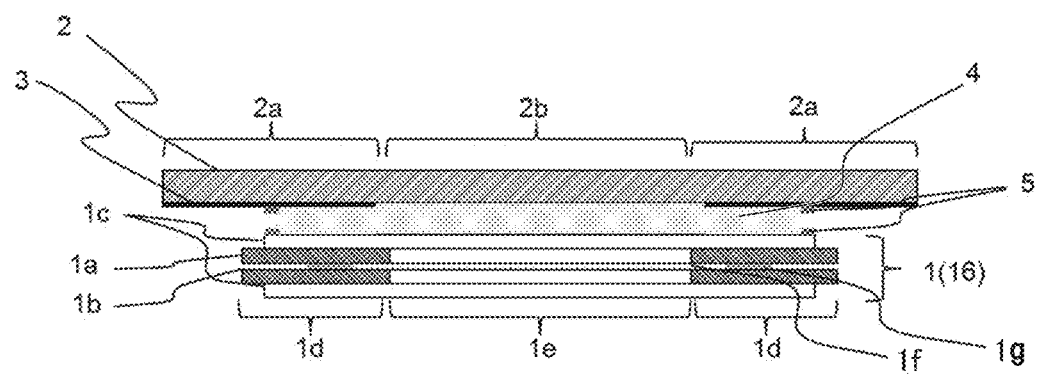
Figure 2:
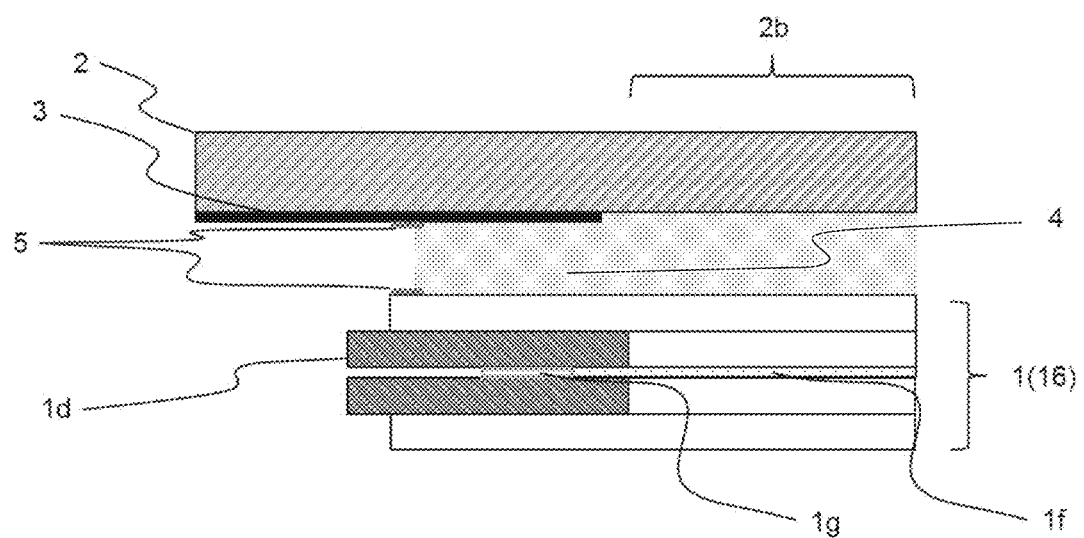
FIG. 2 is a fragmentary enlarged side elevational section of the apparatus of the exemplary embodiment that uses the liquid crystal panel as a kind of an image display device for the base unit (the first exemplary embodiment)

FIG. 1A is a plan view showing a structural example of an apparatus that uses a liquid crystal panel as a kind of an image display device for a base unit, FIG. 1B is a side elevational section thereof, and FIG. 2 is a fragmentary sectional view of the base unit and the image display device.

This embodiment shows an example of a case where a curing resin 4 in a gap of a light-shielding region is cured to the deep part by UV light irradiated from a side face direction of the gap in the outer circumference of a cover plate 2 and a liquid crystal panel 1 in an apparatus in which a base unit 16 that uses the liquid crystal panel 1 for the image display region and the cover plate 2 having a light-shielding part 3 are laminated via the whole surfaces thereof by using the photocurable curing resin 4.

The base unit 16 is a base substrate to which the cover plate 2 can be laminated, which is an image display device such as a flat display, a liquid crystal display device, a liquid crystal panel, or an LCD module, for example. Here, a case of using a liquid crystal panel will be described as a way of example.

The liquid crystal panel 1 as the base unit 16 includes a display region 1e for displaying images, and a wiring region 1d for supplying display signals in the periphery of the display region 1e.

TFT elements, RGB (red, green, blue pixels), and BM (black matrix), which are not shown, are formed in the display region 1e, and images are displayed thereon upon receiving display signals.

The wiring region 1d includes a wiring, not shown, for supplying display signals to the TFT elements. A metal film or the like is used for the wiring, so that light is not transmitted. Further, a light-shielding film is formed in the wiring region 1d to shield the light from a backlight that is not shown.

The liquid crystal panel 1 to be the base unit 16 is constituted with: a TFT substrate 1b on which the TFT elements and the like are formed; a color filter substrate 1a on which RGB, BM, and the like are formed; a seal 1g for providing an arbitrary gap between the TFT substrate 1b and the color filter substrate 1a; a liquid crystal agent 1f filled in the gap between the TFT substrate 1b and the color filter substrate 1a; a polarization plate/optical compensation film 1c laminated on the front surface and the back surface thereof; and the like.

The cover plate 2 having the light-shielding part 3 is transparent glass, reinforced glass, an acryl plate, a substrate using plastics such as a PET plate or the like, or a composite substrate of those. In the outer circumference part thereof other than the part (a transparent region 2b) which corresponds to the display region 1e of the base unit 16 when laminating the cover plate 2 and the base unit 16, a light-shielding region 2a is provided by a light-shielding part 3 formed by black ink exhibiting a light-shielding characteristic.

While the black ink is used for the light-shielding part 3 of this exemplary embodiment, it is also possible to provide the light-shielding part 3 by using a material exhibiting a light-shielding characteristic (e.g., color ink) or by using surface processing exhibiting a lights-shielding characteristic (e.g., reflection film deposition).

A molding member 5 is a material exhibiting liquid repellency for the curing resin 4, and it is possible to use a composite containing a fluorine compound, a composite containing a silicon compound, a composite containing an acryl compound, or the like. For example, in a case where a composite containing an acryl compound is used for the curing resin 4, a composite containing a silicon compound is used as the molding member 5.

As a method for checking the liquid repellency, there are a method which checks the contact angle between the curing resin 4 and the molding member 5 and a method which checks the wet area. It is preferable to use a material that has a high contact angle with respect to the curing resin 4 and a material of a small wet area for the molding member 5.

Further, it is also possible to form the molding member 5 by using a curing resin that is cured not by light but by heat, moisture or the like or by using a double-sided adhesive tape or the like.

Among those, it is preferable to use a material which is a transparent photocurable resin and has a refractive index that is equivalent to the refractive index of the curing resin 4 which is used for laminating the cover plate 2 and the liquid crystal panel 1 via the whole surfaces in view of the flexibility for the thickness, the workability, and visibility.

The molding member 5 is provided at both or one of the cover plate 2 and the liquid crystal panel 1 facing to the gap between the light-shielding region 2a of the cover plate 2 and the light-shielding region 1a of the liquid crystal panel 1.

In this exemplary embodiment, shown is a case where the molding member 5 is provided to both the cover plate 2 and the liquid crystal panel 1 in the upper part at the position overlapping with each other when viewed from the normal direction of the faces of the cover plate 2 and the liquid crystal panel 1.

When the molding member 5 is applied too thick, the molding member 5 itself may obstruct the incident of the UV light required for curing the curing resin 4 by diffraction, attenuation, or the like. Therefore, it is preferable for the applied thickness of the molding member 5 to be ⅕ or less of the height of the gap between the cover plate 2 and the liquid crystal panel 1 and, more desirably, to be in a range of 0.03 mm to 0.001 mm. For example, in a case where the height of the gap between the cover plate 2 and the liquid crystal panel 1 is about 0.2 mm, it is preferable for the thickness of the molding member 5 to be about 0.02 mm.

As the curing resin 4 used for laminating the base unit 16 and the cover plate 2, there are a thermosetting resin, a moisture-curable resin, a photocurable resin, and a hybrid curable resin that is a combination of curing methods using heat, moisture, and light. For example, in a case of using a photocurable resin, it is cured by using an active energy ray. Further, in a case of using a thermosetting resin, it is cured by performing heating processing using a hot air circulating thermostat oven, a device for irradiating far-infrared rays, or the like. In a case of using a moisture-curable resin, it can be cured by performing moisturizing processing using a moisture tank, etc., or by saving it in a normal room environment. Furthermore, it is also possible to use a hybrid curable resin having a photocurable function and a thermosetting function or having a photocurable function and a moisture-curable function to cure the resins by combining the respective methods.

This exemplary embodiment will be described by referring to a case of using a photocurable resin and a case of using UV light 9 as an active energy ray.

The curing resin 4 spreads in the gap between the cover plate 2 and the liquid crystal panel 1, reaches the molding member 5 that is disposed to the cover plate 2 and the liquid crystal panel 1, and is repelled by the molding member 5 so that the end part sectional shape of the curing resin 4 is controlled to a specific shape that is determined according to the disposed layout, material, and other conditions of the molding member 5. Thereby, the spread of the curing resin 4 is stopped.

That is, the molding member 5 is a molding member for restricting the spread region of the curing resin 4 and also a molding member for molding the end part sectional shape of the curing resin 4 (a molding member having a function of controlling the end part sectional shape of the curing resin 4 to be in a specific shape).

Figure 3A:
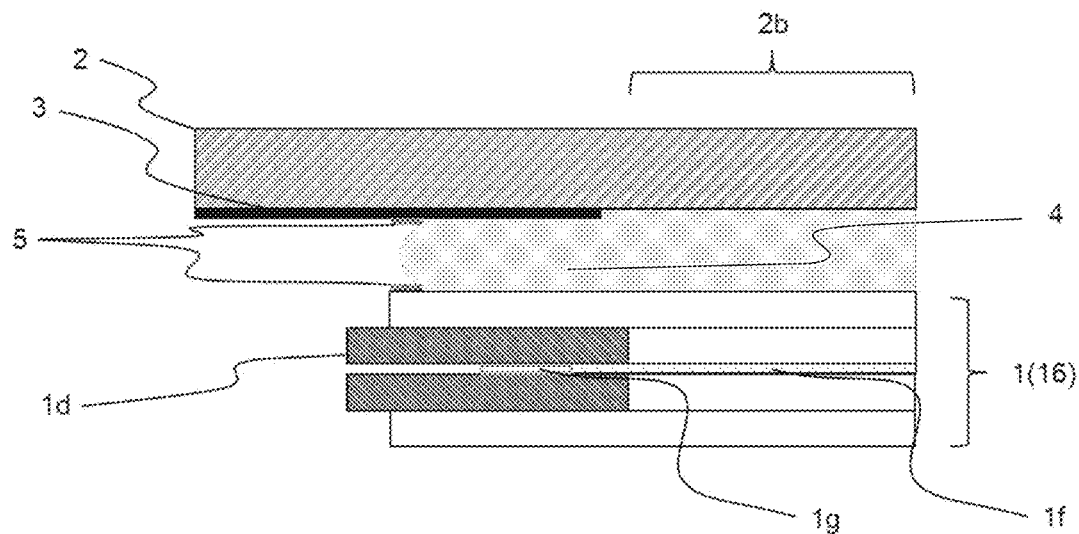
Figure 3B:
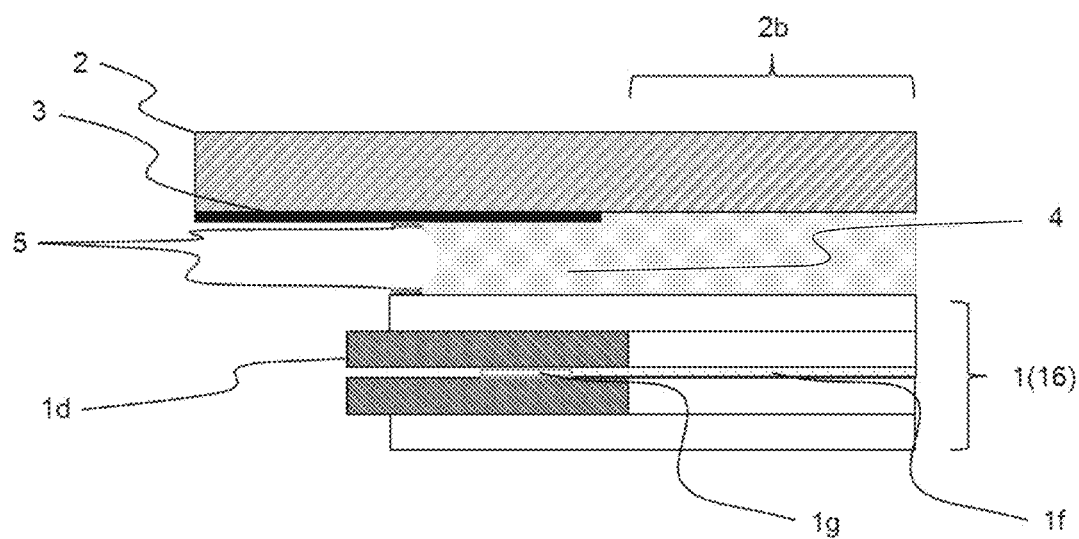

More specifically, the end part sectional shape of the curing resin 4 that has reached the molding member 5 comes to be in a shape to connect the molding member 5 on the cover plate 2 side and the molding member 5 on the liquid crystal panel 1 side. In practice, the end part sectional shape is an arc shape protruded on the outer side or on the inner side specified by the liquid repellency of the molding member 5 and the surface tension or the like of the curing resin 4 as shown in FIG. 3A or FIG. 3B.

Thus, even if there are small variations in the volume of the curing resin 4 measured by a dispenser or the like, the end part sectional shape thereof forms an arc shape protruded on the outer side (state of FIG. 3A) when the volume of the curing resin 4 is large and forms an arc shape protruded on the inner side (state of FIG. 3B) when the volume of the curing resin 4 is small so that the measurement error can be absorbed. Therefore, it is possible to prevent in advance the curing resin 4 in an uncured state from flowing out to the outer side by going over the molding member 5.

The molding member 5 can be disposed at an arbitrary position of the light-shielding region. However, it is preferable to dispose the molding member 5 in the outer circumferential end part of the cover plate 2 and the liquid crystal panel 1.

Figure 4:
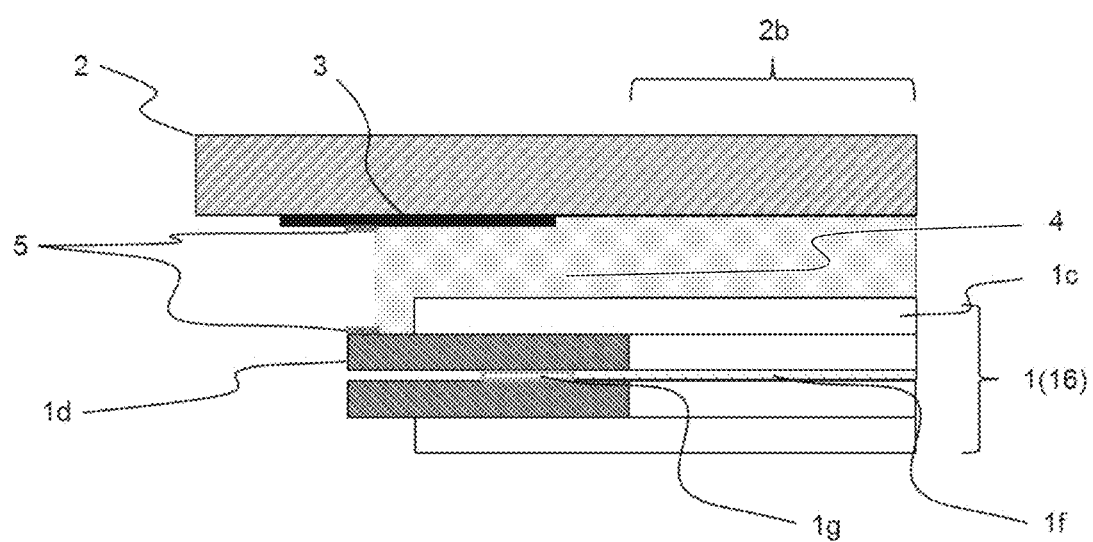
FIG. 4 is a side elevational section showing an example where a molding member is disposed in the outer circumferential end part of the liquid crystal panel of the apparatus of the exemplary embodiment that uses the liquid crystal panel as a kind of an image display device for the base unit (the first exemplary embodiment)

Through disposing the molding member 5 in the outer circumferential end part of the cover plate 2 and the liquid crystal panel 1, as shown in FIG. 4, for example, the curing resin 4 can be filled up to the outer circumferential end part. Thus, the area for sticking the cover plate 2 and the liquid crystal panel 1 by the curing resin 4 can be widened, so that the adhesive strength between the cover plate 2 and the liquid crystal panel 1 can be reinforced.

Further, through disposing the molding member 5 at a position so that the curing resin 4 covers the polarization plate/optical film 1c laminated to the front surface and back surface of the crystal liquid panel 1, the curing resin 4 can function as a protection film. Thus, it is possible to suppress deterioration of the polarization plate/optical film 1c.

Further, the molding member 5 can also be employed for a part of the periphery of the light-shielding region 1d.

Even in a case where the light-shielding part 3 of the cover plate 2 is not provided until reaching the outer circumferential end of the cover plate 2 so that the light is shielded in the region from the transparent region 2b on the display region 1e to the middle of the outer circumferential end of the cover plate 2, the end part shape of the curing resin 4 can be molded as shown in FIG. 4, for example, by disposing the molding member 5 in the gap between the cover plate 2 and the liquid crystal panel 1.

In the above, an example of the apparatus in which the cover plate 2 having the light-shielding part is laminated to the base unit 16 that is constituted with the liquid crystal panel 1 is described. However, it is also possible to employ a structure in which a touch panel function is added by using a substrate having a touch sensor 6 that is a kind of an input device for the base unit 16 or the cover plate 2.

Figure 5:
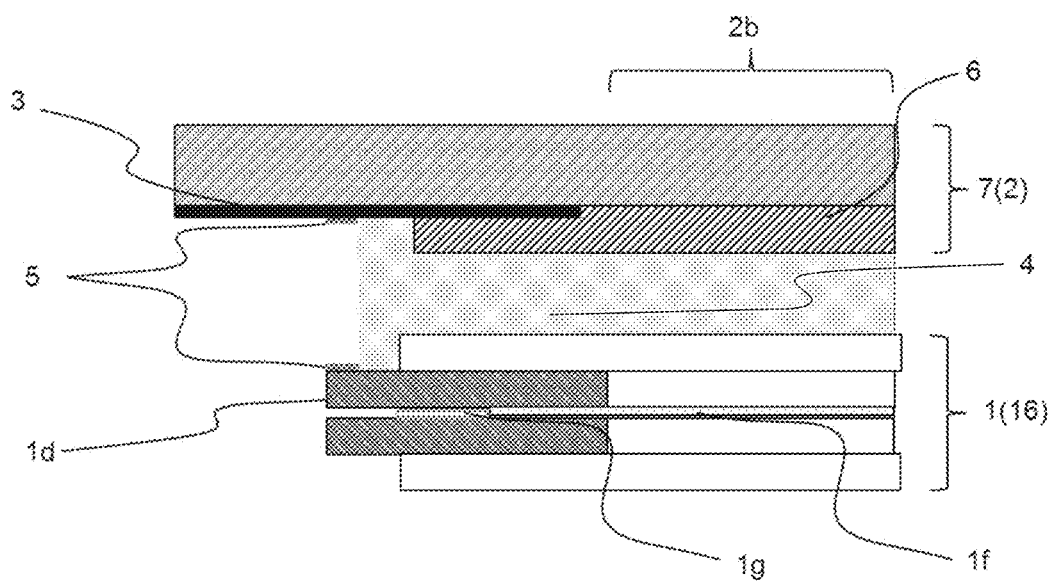
FIG. 5 is a side elevational section showing an example of a structure which uses a touch-sensor cover plate instead of a normal cover plate (a modification example of the first exemplary embodiment)

FIG. 5 shows a case which uses a touch-sensor cover plate 7 acquired by adding the touch sensor 6 to the back surface of the cover plate 2.

Further, through providing the molding member 5 at the end of the light-shielding part 3 to prevent the curing resin 4 from becoming in contact with the light-shielding part 3, it is possible to prevent the light-shielding part 3 from becoming deteriorated due to chemical changes or the like by the influence of the curing resin 4.

Figure 6:
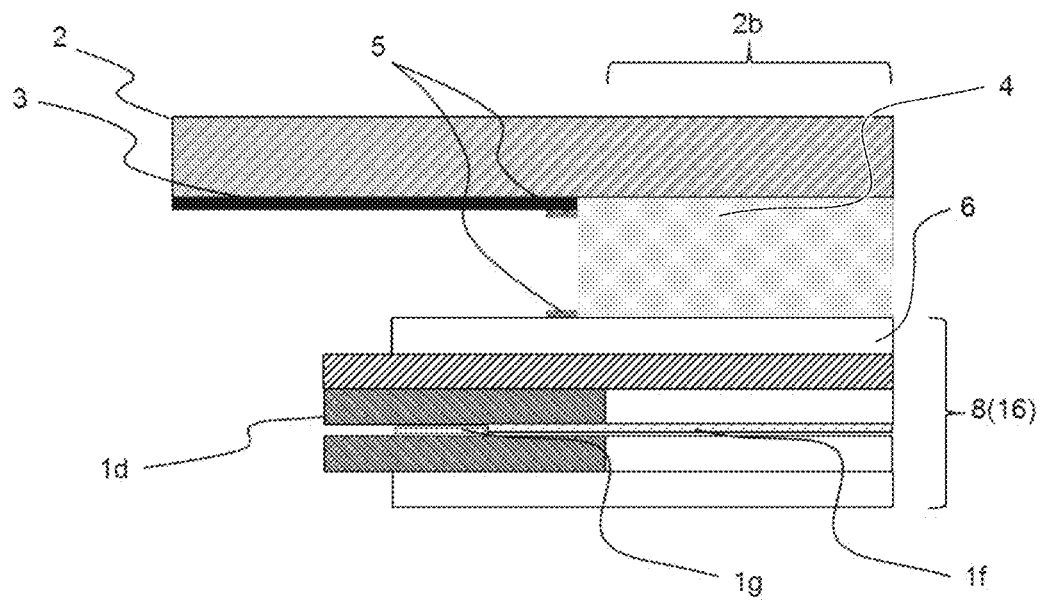
FIG. 6 is a side elevational section showing an example of a structure which uses a touch-sensor liquid crystal panel instead of a normal liquid crystal panel (a modification example of the first exemplary embodiment)

FIG. 6 shows a case where the molding member 5 is disposed at the edge of the light-shielding part 3 and a touch-sensor liquid crystal panel 8 acquired by adding the touch sensor 6 that is an input device to the surface of the liquid crystal panel 1 of the base unit 16 is used.

Further, while the case where both the base unit 16 and the cover plate 2 exhibit the light-shielding characteristic (the wiring region 1d, the light-shielding part 3) is described herein, it is also possible to employ a structure in which only the base unit 16 or the cover plate 2 exhibits the light-shielding characteristic or a structure in which the both do not exhibit the light-shielding characteristic.

Figure 7:
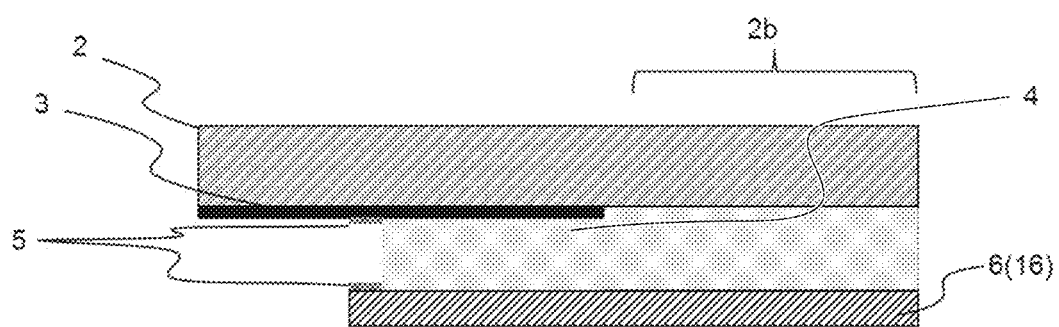
FIG. 7 is a side elevational section showing an example of a structure which uses a touch sensor exhibiting no light-shielding characteristic for the base unit (a modification example of the first exemplary embodiment)
Figure 8:
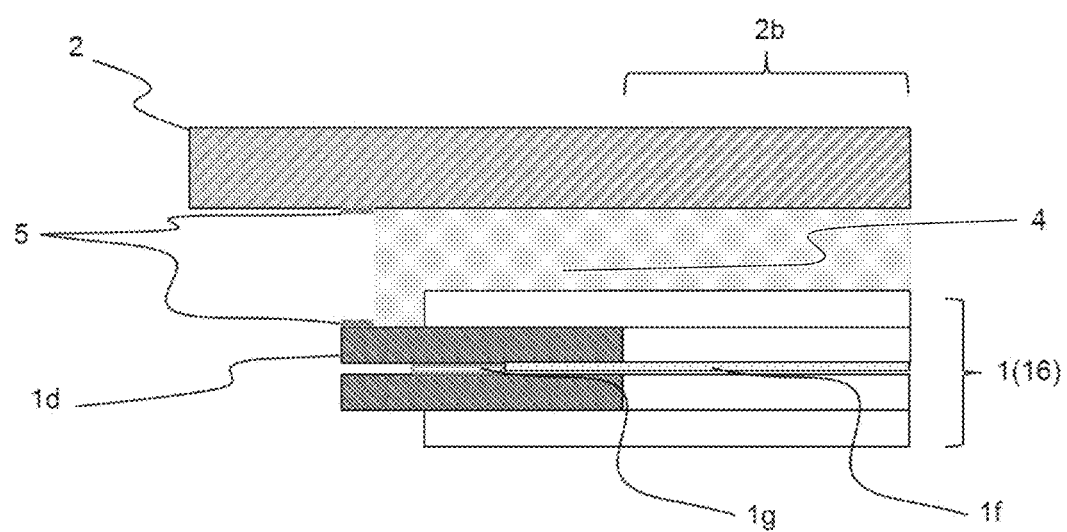
FIG. 8 is a side elevational section showing an example of a structure which uses a transparent cover plate exhibiting no light-shielding characteristic (a modification example of the first exemplary embodiment)

FIG. 7 shows a case of using the touch sensor 6 exhibiting no light-shielding characteristic for the base unit 16, and FIG. 8 shows a case of using the transparent cover plate 2 exhibiting no light-shielding characteristic. Further, FIG. 9 shows a case of using a touch sensor exhibiting no light-shielding characteristic for the base unit 16 and also using transparent glass exhibiting no light-shielding for the cover plate 2, i.e., a case where both the base unit 16 and the cover plate 2 exhibit no light-shielding characteristic.

Figure 9:
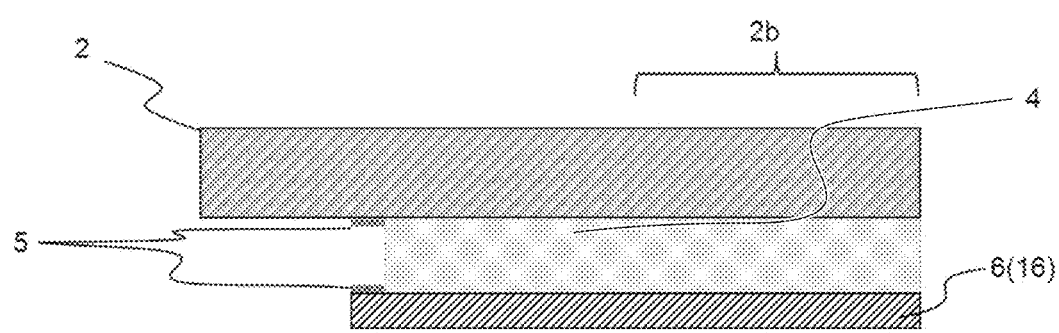
FIG. 9 is a side elevational section showing an example of a structure which uses a base unit and a cover plate both exhibiting no light-shielding characteristic (a modification example of the first exemplary embodiment)

Even in the case where both the base unit 16 and the cover plate 2 exhibit no light-shielding characteristic as shown in FIG. 9, it is possible to prevent extrusion of the curing resin 4 by restricting the spread range of the curing resin 4 by the molding member 5 to mold the end part sectional shape and to acquire the necessary adhesive strength by controlling the contact area of the curing resin 4 with the base unit 16 and the cover plate 2.

Next, a demonstration experiment for verifying that the end part sectional shape of the curing resin changes due to the influence of the molding member will be described briefly by referring to FIG. 10 and FIG. 11.

Four evaluation samples were prepared. The height of the gap was controlled by the applying amount of the curing resin 4 so that the gap between the cover plate 2 and the liquid crystal panel 1 became 0.2 mm, and the molding member 5 was disposed in such a manner that the molding member 5 on the cover plate 2 side and the molding member 5 on the liquid crystal panel 1 side were located at position in parallel to each other in the gap between the cover plate 2 and the liquid crystal panel 1.

As shown in FIG. 10A, in one of the evaluation samples, the molding member 5 of the cover plate 2 side and the molding member 5 of the liquid crystal panel 1 side were disposed in such a manner that the both molding members 5 overlap with each other when viewed from the above the cover plate 2, i.e., from the normal directions of the surfaces of the cover plate 2 and the liquid crystal panel 1 so that the outer circumferential end face of the curing resin 4 was adjusted to be at an right angle with respect to the surfaces of the cover plate 2 and the liquid crystal panel 1 (hereinafter, referred to as shape (1)).

As shown in FIG. 10B, in another one of the evaluation samples, the molding member 5 of the cover plate 2 side was located by being shifted on the outer circumference side of the cover plate 2 by 0.1 mm with respect to the position of the molding member 5 on the liquid crystal panel 1 side and the outer circumferential end face of the curing resin 4 was adjusted to form a tapered shape which gradually widens towards the outer side as becoming distant from the liquid crystal panel 1 (hereinafter, referred to as shape (2)).

As shown in FIG. 10C, in still another one of the evaluation samples, the molding member 5 of the cover plate 2 side was located by being shifted on the inner circumference side of the cover plate 2 by 0.1 mm with respect to the position of the molding member 5 on the liquid crystal panel 1 side and the outer circumferential end face of the curing resin 4 was adjusted to form a tapered shape which gradually widens towards the outer side as becoming distant from the liquid crystal panel 1 (hereinafter, referred to as shape (3)).

In all of the above samples, light is shielded from the outer circumference of the liquid crystal panel 1 to the point 20 mm therefrom by the light-shielding part 3 of the cover plate 2. As the last one of the evaluation samples, a sample in which a bead-like dam material (resin) 10 for preventing extrusion of the curing resin 4 formed on the liquid crystal panel 1 was prepared as a comparison target (hereinafter, referred to as shape (4)). Note that "bead-like" generally means a sectional shape swollen in a semi-ellipse shape like a weld bead, which is in a squeezed out state from a nozzle of a dispenser and connected in a line.

The above-described shapes from (1) to (4) were observed by a microscope while having the evaluation samples placed straight up so that the end part sectional shape of the curing resin 4 can be checked.

In the shape (1), the outer circumferential end face of the curing rein 4 was formed at an angle of about 90 degrees by taking the state in parallel to the surfaces of the cover plate 2 and the liquid crystal panel 1 as 0 degree (see FIG. 11A).

In the shape (2), the outer circumferential end face of the curing resin 4 was formed at an angle of about 120 degrees by taking the state in parallel to the surfaces of the cover plate 2 and the liquid crystal panel 1 as 0 degree (see FIG. 11B).

In the shape (3), the outer circumferential end face of the curing rein 4 was formed at an angle of about 60 degrees by taking the state in parallel to the surfaces of the cover plate 2 and the liquid crystal panel 1 as 0 degree (see FIG. 11C).

As in the above, it was verified that the curing resin 4 was shaped along the molding member 5 without extruding towards outer side of the molding member 5 and the spread region of the curing resin 4 was restricted by the molding member 5 in all of the shapes (1) to (3).

By checking the shape of the dam material 10 in the shape (4), it was verified that the average angle in the bead-like state slope part was about 80 degrees, there was a gap of about 0.05 mm between the dam material 10 and the cover plate 2, and there was a curing resin 4e extruded towards the outer side of the dam material 10 from the gap (see FIG. 11D).

The reason for such result is considered as follows. That is, in the shapes (1) to (3), extrusion of only the top and bottom end parts of the outer circumferential end face of the curing resin 4 towards the outer side is restricted by the molding member 5 on the cover plate 2 side and the molding member 5 on the liquid crystal panel 1 side while the other part is left substantially a free end so that the excess and deficiency of the curing resin 4 can be absorbed by a shape change of some extent in the free end. Meanwhile, in the shape (4), the shape change in most of the outer circumferential end face of the curing resin 4 is restricted by the dam material 10. Therefore, the excessive curing resin 4 is forcibly extruded out from the gap of a small width formed between the dam material 10 and the cover plate 2.

That is, the molding member 5 functioning as the molding member for shaping the end face sectional shape of the curing resin 4 in particular is a molding member having a function of controlling the end face sectional shape, which is the free end, of the curing resin 4 into a specific shape.

Further, the curing depth was checked to see how deep the curing resin between the cover plate and the liquid crystal panel was cured by changing the end part sectional shape of the photocurable resin. Furthermore, the relation between the adhesive strength for the cover plate by an external force and the curing depth was checked.

Specifically, a specific amount of UV light 9 was irradiated from the side of the outer circumference side of the cover plate 2 to the evaluation samples of the above-described shapes (1) to (3) to cure the curing resin 4 in the gap between the cover plate 2 and the light-shielding region of the liquid crystal panel 1, the curing depth and the adhesive strength were measured, and it was observed to see whether leak out of the curing resin 4 occurs when forcible exfoliation operations were executed.

Regarding the adhesive strength, the evaluation samples acquired by laminating the cover plate 2 and the liquid crystal panel 1 with the curing resin 4 in such a manner that the end part shape of the curing resin 4 was in the above-described shapes (1) to (4) were prepared.

Regarding each of those samples, exfoliation tests were performed by exfoliating the cover plate 2 from the liquid crystal panel 1 to measure the strength, and the measured strength was divided by the applied area of the curing resin 4 to acquire the adhesive strength per unit area. Thus, when there is an uncured part in the curing resin 4, or example, the adhesive strength per unit area is weak. In the meantime, when the curing resin 4 is sufficiently cured, the adhesive strength per unit area is strong.

Regarding the curing depth, the cover plate 2 and the liquid crystal panel 1 were forcibly exfoliated, and the dimension of the cured region from the outer circumferential part of the curing resin 4 was measured. Thus, when the UV light 9 reaches the deep part of the curing resin 4, for example, the curing depth is deep. In the meantime, when the UV light 9 does not reach the deep part, the curing depth is shallow. Thus, an uncured part is generated. Regarding whether or not there is extrusion of the curing resin 4, occurrence of a phenomenon where the curing resin 4 is extruded out from the exfoliation surface due to its uncured part at the time of forcible exfoliation was checked. When occurrence of such phenomenon is observed, it is judged that there is a leak of the liquid.

The results thereof are shown in Table 1.

TABLE 1

Examples of curing depth and adhesive strength according to end part sectional shape of photocurable resin (GAP 0.2 mm)

| Curing resin end part sectional shape | End part section angle | Curing depth | Adhesive strength N/mm^2 | Leak of liquid by external force |
|---|---|---|---|---|
| Shape (1) | 90 degrees | 20 mm (max) | 0.35-0.39 | No |
| Shape (2) | 120 degrees | 0.5-2 mm | 0.01-0.05 | Yes |
| Shape (3) | 60 degrees | 0.5-2 mm | 0.01-0.05 | Yes |
| Shape (4) | 80 degrees | 3-6 mm | 0.08-0.16 | Yes |

As a result, in the shape (1), the curing depth reached as deep as 20 mm, and the adhesive strength of 0.35-0.39 N/mm^2 was acquired.

Further, in the shape (2) and the shape (3), the curing depth was 2 mm or less, and the adhesive strength was the value of 0.05 N/mm^2 or less.

That is, it is possible to control the curing depth by the sectional shape of the outer side end part.

The adhesive strength is increased by deepening the curing depth, so that extrusion can be prevented.

Further, in the shape (4), the curing depth was 6 mm or less, and the adhesive strength was the value of 0.16 N/mm^2 or less. Therefore, extrusion occurred.

Figure 12:
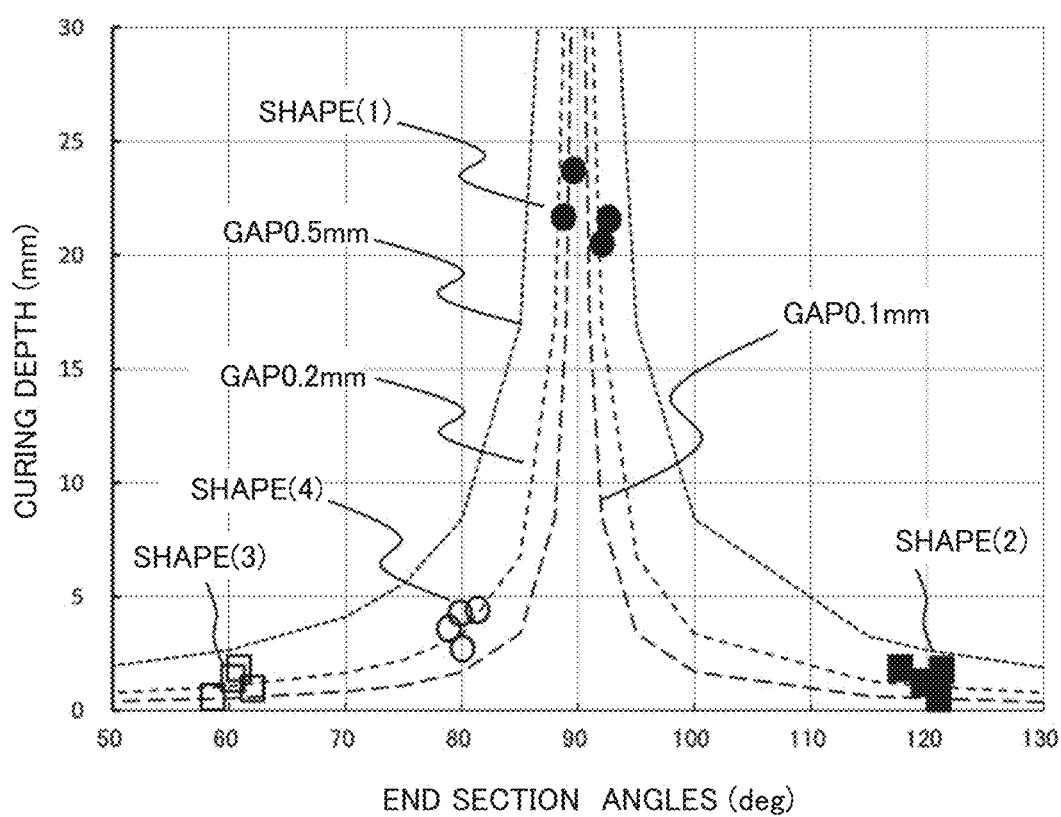
FIG. 12 is a chart showing the relation between the curing depth and the angle of the end part sectional shape of the curing resin located in the gap between the cover plate and the liquid crystal panel.

Furthermore, the relation between the curing depth and the shapes of each of the cases were checked by changing the gap between the cover plate 2 and the liquid crystal panel 1 between 0.5 mm and 0.1 mm in the above-described shapes (1) to (4). Examples of the result are shown in FIG. 12.

Even when the angle of the end part section is about 80 degrees in a case where the gap between the cover plate 2 and the liquid crystal panel 1 is set as 0.5 mm, the curing depth of about 10 mm can be acquired. However, in a case where the gap is set as 0.1 mm, the curing depth of only about 2 mm is acquired.

Based on that, it can be understood that the curing depth of the curing resin 4 provided in the gap can be controlled according to the angle of the end part section and the dimension of the gap between the cover plate 2 and the liquid crystal panel 1.

Further, the result acquired by checking the time-series changes of the wet area when the curing resin 4 was placed on the molding member 5 is shown in Table 2.

TABLE 2

Examples of checking liquid repellency of molding member according to wet area

| | Wet area of curing resin 4 (mm^2) | | | | | |
|---|---|---|---|---|---|---|
| Material of molding member 5 | Immediately after application | 1 min after application | 3 min after application | 5 min after application | 7 min after application | 10 min after application |
| Glass substrate to which composite containing silicon compound is applied | 352 | 547 | 631 | 675 | 697 | 697 |
| Glass substrate to which composite containing acryl compound is applied | 374 | 1083 | 1261 | 1323 | 1452 | 1452 |
| Glass substrate | 365 | 768 | 817 | 842 | 867 | 867 |

When checking the changes in the wet area, as shown in FIG. 13A, each of a composite containing a silicon compound and a composite containing an acryl compound as a material 5a of the molding member 5 was applied uniformly on the glass substrate corresponding to the cover plate 2. Further, a curing resin material 4d was applied thereon, and the wet spread areas after each of the time passages from the application thereof were measured. For the curing resin 4, a composite containing an acryl compound was used. FIG. 13B shows an example of the wet spread state after the time has passed.

As shown in Table 2, immediately after the curing resin 4 was applied in each of the materials, the wet area was about 360 mm^2 It spread until about five minutes, and the wet spread almost stopped after seven minutes passed.

Further, the wet spread fast with the glass substrate on which the composite containing the acryl compound was applied. One minute after the composite was applied, the wet spread to about 3 times that of immediately after application. With the glass substrate on which the composite containing the silicon compound was applied, one minute after application the wet spread to about 1.5 times that of immediately after apply. Even after seven minutes at which the wet spread ended, the wet spread was 2 times or less.

With the substrate on which the composite containing the silicon compound was applied, the wet area was about 50% compared to that of the substrate on which the composite containing the acryl compound was applied. Compared to the glass substrate on which the material of the molding member 5 was not applied, the wet area was about 80%. Thus, it can be verified that the composite containing the silicon compound exhibits high liquid repellency for the curing resin 4, and that it is suited for the material of the molding member 5.

According to this result, when the composite containing the acryl compound is used for the molding member 5, the curing resin may be extruded out by going over the molding member 5 in about three minutes. Therefore, there is no sufficient time in steps until the curing processing by the UV light 9, so that it is difficult to perform stable processing. In the meantime, when the composite containing the silicon compound is used, the wet spread area is small even seven minutes has passed after applying the curing resin 4 so that the curing resin 4 does not likely to go over the molding member 5. Therefore, there is a sufficient time generated in the steps until the curing processing of by the UV light 9, so that stable processing can be performed.

Next, an apparatus manufacturing method of the present invention will be described briefly by referring to a case of the apparatus in which the base unit 16 using the liquid crystal panel 1 in the image display region and the cover plate 2 having the light-shielding part 3 are laminated via the whole surfaces thereof by using the curing resin 4 that is a photocurable resin.

FIGS. 14A-14D show a schematic view of step showing the manufacturing steps thereof.

Figure 14A:
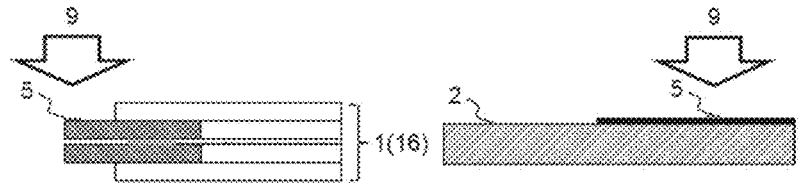

First, as shown in FIG. 14A, the molding member 5 using the silicon compound, for example, is formed on the liquid crystal panel 1 and the cover plate 2 that has the light-shielding part 3.

The method for applying the molding member 5 is not specifically limited. For example, there are a method using a dispenser, a method using printing, and the like. Among those, the method using printing is preferable in respect that it is possible to control the film thickness at the time of applying the molding member to be thin.

In a case of using a photocurable resin for the molding member 5, employed as the method for curing the molding member 5 is to irradiate the UV light 9 from the above the applied surfaces of the molding member 5 of the cover plate 2 and the liquid crystal panel 1 to cure the photocurable resin 4. The method for curing the molding member 5 is not specifically limited. For example, there are a method which irradiates the light collectively by an UV lamp provided above the applying surfaces by placing the applying surfaces of the cover plate 2 and the liquid crystal panel 1 on the upper side, a method which irradiates the light by using an UV lamp provided above the applying surfaces while transporting the cover plate 2 and the liquid crystal display panel 1 by a conveyor by placing the applying surfaces thereof on the upper side, and a method which irradiates the light by scanning the surfaces uniformly by using a spot UV lamp. Among those, it is preferable to use the method which irradiates the light by the UV lamp while conveying them by a conveyor in view of the uniformity of the cured condition resulted from the irradiation.

Figure 14B:
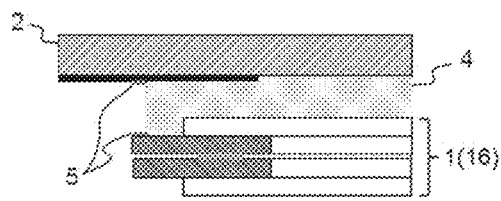

Then, as shown in FIG. 14B, the photocurable resin (the curing resin 4) is applied at least on the liquid crystal panel 1 or the cover plate 2, the base unit 16 and the cover plate 2 are aligned and laminated by using the uncured curing resin 4, and those are left alone until the curing resin 4 reaches the molding member 5 disposed on the cover plate 2 and the liquid crystal panel 1 and the spread of the curing resin 4 stops by being repelled by the molding member 5. The method for applying the photocurable resin is not specifically limited. For example, there are a method which uses a dispenser, a method which uses a coater, and a method which uses printing. Among those, it is preferable to use the method using the dispenser for controlling the applying amount and for preventing air bubbles mixed at the time of lamination.

The method for positioning the base unit 16 and the cover plate is not specifically limited. For example, there are a method which determines positions according to the external shapes as the reference, a method called image processing positioning which determines positions by image-processing the light-shielding part pattern of the cover plate 2 and the positioning mark for lamination, not shown, provided to the liquid crystal panel 1 of the base unit 16, and the like. Among those, it is preferable to use the image processing positioning in view of the positioning precision.

The method for laminating the base unit 16 and the cover plate 2 is not specifically limited. For example, regarding the laminating environment, there are a method which laminates them under a normal pressure and a method which laminates them in vacuum. Further, as the lamination method, there are a method which laminates them by a roller, a method which laminates them by parallel flat plates, and the like. Among those, it is preferable to use the method which laminates them by the parallel flat plates in vacuum for preventing air bubbles mixed when laminating them.

Figure 14C:
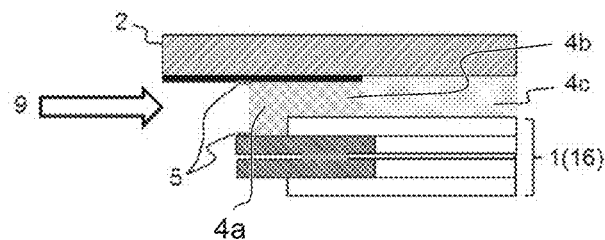

Then, as shown in FIG. 14C, the curing resin 4 (the photocurable resin) in the gap between the cover plate 2 and the light-shielding part of the liquid crystal panel 1, i.e., the curing resin 4a in the end part region in the outer circumferential part and the curing resin 4 in the deep part region out of the curing resin in the gap between the cover plate 2 and the liquid crystal panel 1, is cured by the UV light 9.

The curing resin 4b in the gap between the cover plate 2 and the liquid crystal panel 1 is cured by irradiating the UV light towards the gap on a plane including the gap between the cover plate 2 and the liquid crystal panel 1 from the outer side position than the outer circumference of the cover plate 2 and the liquid crystal panel 1, i.e., cured by irradiating the UV light 9 from the side face direction of the gap between the cover plate 2 and the liquid crystal panel 1. At that time, the UV light 9 is irradiated by using an optical lens or the like capable of adjusting the UV light 9 to be in parallel to the gap. The UV light 9 can be irradiated with a stable luminance intensity for curing by using an LED light source.

In the case shown in FIG. 4, the outer circumferential end face of the curing resin 4 is at a right angle with respect to the faces of the cover plate 2 and the liquid crystal panel 1, i.e., the outer circumferential end face is orthogonal to the irradiating direction of the UV light 9. Therefore, the UV light 9 irradiated towards the gap reaches the deep part without being refracted by the interface between the air in the irradiation environment and the curing resin 4 so that the curing resin 4b in the deep part region located in the deep part of the gap can be cured.

Figure 14D:
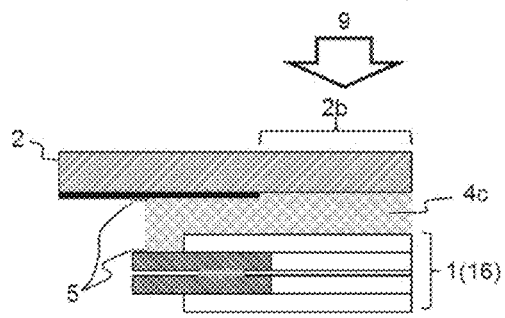

Then, as shown in FIG. 14D, the UV light 9 is irradiated from the above the cover plate 2 or from the bottom side of the liquid crystal panel 1 to the curing resin 4c in the display region in the bottom face side of the transparent region 2b of the cover plate 2 to cure the curing resin 4 (the photocurable resin) of this part. That is, the uncured curing resin 4c in the remaining part of the transparent part of the cover plate 2 is cured by irradiating the UV light towards the upper face of the cover plate 2 or the bottom face of the liquid crystal panel 1 from the position isolated in the normal direction from the plane including the gap between the cover plate 2 and the liquid crystal panel 1. FIG. 14D shows a case where the light is irradiated from the above the cover plate 2.

The method for curing the curing resin 4c in the display region is not specifically limited. For example, there are a method which irradiates the light collectively by an UV lamp provided above the cover plate 2 by placing the cover plate 2 of the laminated cover plate 2 and the liquid crystal panel 1 on the upper side, a method which irradiates the light by performing scanning uniformly by using a spot UV lamp, a method which irradiates the light by using an UV lamp provided under the cover plate 2 while transporting the cover plate 2 and the base unit 16 by a conveyor by placing the cover plate 2 on the lower side. Among those, it is preferable to use the method which irradiates the light from the bottom side by the UV lamp while conveying them by a conveyor in view of the uniformity of the cured condition resulted from the irradiation.

As described, through curing the curing resin 4b in the light-shielding region of the outer circumferential part prior to curing the curing resin 4c on the transparent region of the cover plate 2, it is possible to effectively prevent the curing resin 4 from becoming extruded from the outer circumferential part of the cover plate 2 and the liquid crystal panel 1 in the curing process.

Operational Effects of First Exemplary Embodiment

Next, operational effects related to assembling of the apparatus according to the first exemplary embodiment will be described by referring to FIG. 15.

The apparatus herein is a structure in which the laminated cover plate and the liquid crystal panel are mounted into a chassis.

When mounting the laminated cover plate 2 and the liquid crystal panel 1 into a chassis 17, positions of the external shape of the cover plate 2 or the liquid crystal panel 1 and the inner wall of the chassis 17 are aligned, and the laminated cover plate 2 and the liquid crystal panel 1 are fitted into the chassis 17 and fixed. Here, a case of aligning the external shape of the cover plate 2 and the chassis 17 will be described.

In the cover plate 2 and the liquid crystal panel 1 of this exemplary embodiment, as shown in FIG. 15A1 and FIG. 15A2, the curing resin 4 stays on the inner side of the cover plate 2 than the position where the molding member 5 is disposed. Thus, positions of the external shape of the cover plate 2 and the inner wall of the chassis 17 can be aligned so that the laminated cover plate 2 and the liquid crystal panel 1 can be mounted into the chassis 17 properly.

Further, the curing resin 4 does not contaminate the cover plate 2, the base unit 16, the chassis 17, and the surrounding environment thereof.

In the meantime, in a case where the dam material 10 is provided to the liquid crystal panel 1, there is a gap generated between the dam material 10 and the cover plate 2 by the warping of the cover plate 2 and the liquid crystal panel 1 and, as shown in FIG. 15B1 and FIG. 15B2, the curing resin 4 is extruded out from the gap and a curing resin extrusion 4e is formed on the outer side of the dam material 10.

The positions of the cover plate 2 and the inner wall of the chassis 17 cannot be aligned due to the extruded curing resin 4e, so that the laminated cover plate 2 and the liquid crystal panel 1 cannot be mounted into the chassis 17 properly.

Further, the curing resin 4 contaminates the cover plate 2, the base unit 16, the chassis 17, and the surrounding environment thereof.

Another operational effect of the first exemplary embodiment will be described by referring to FIG. 16A1-FIG. 16B2.

It is assumed that an external force 11 for separating the laminated cover plate 2 and the liquid crystal panel 1 is applied to one (the cover plate 2 in this explanation) of those for some kind of reason.

In the case of the first exemplary embodiment where the end part sectional shape of the curing resin 4 in the gap is formed to be perpendicular by the molding member 5 and cured down to the deep part region of the gap, as shown in FIG. 16A1 and FIG. 16A2, the separating external force 11 is applied to the curing resin 4. However, the curing resin 4 is cured sufficiently to the deep part region. Thus, the adhesive strength of the curing resin 4 is sufficient, so that it is not easily exfoliated.

Further, even if it is exfoliated, the curing resin 4 is cured to the deep part. Thus, it does not flow out from the gap generated by the exfoliation, so that the cover plate 2, the base unit 16, and the surrounding environment are not contaminated.

In the meantime, in a case where the curing resin 4 is cured by providing the bead-like dam material 10 in the gap, as shown in FIG. 16B1 and FIG. 16B2 and as described in the explanation of the shape (4), the deep-region curing resin 4b in the gap is not cured. Thus, the cover plate 2 and the liquid crystal panel 1 are separated from the curing resin 4, and an exfoliated part 13 is generated. On the display region 1e, air bubbles 12 are generated.

Further, the curing resin 4b remained as uncured in the depth part region flows out from the gap of the exfoliated part 13, so that the surrounding environment of the cover plate 2 and the base unit 16 is contaminated.

Effects of First Exemplary Embodiment

Since the curing resin 4 is not extruded out by going over the molding member 5, the cover plate 2, the base unit 16, and the surrounding environment are not contaminated.

Further, even when the external force 11 for separating the cover plate 2 and the liquid crystal panel 1 works, the cover plate 2 and the liquid crystal panel 1 are not easily separated from the curing resin 4. Even if the cover plate 2 and the liquid crystal panel 1 are separated from the curing resin 4, the curing resin 4 does not flow out from the gap of the exfoliated part. Thus, the cover plate 2, the base unit 16, and the surrounding environment are not contaminated.

Since there is no manufacturing process of the dam material 10, it is possible to cut the manufacturing cost such as the material cost for the dam material 10, manufacturing equipment cost, and the like.

Further, it becomes unnecessary to dispose the dam material 10, the width of the light-shielding region 2a can be narrowed to an extent corresponding to the wiring region 1d. Thus, the frame of the display device can be narrowed.

Structure of Second Exemplary Embodiment

Next, the structure of a second exemplary embodiment of the present invention will be described by referring to FIGS. 17A, 17B, and FIG. 18.

Figure 17A:
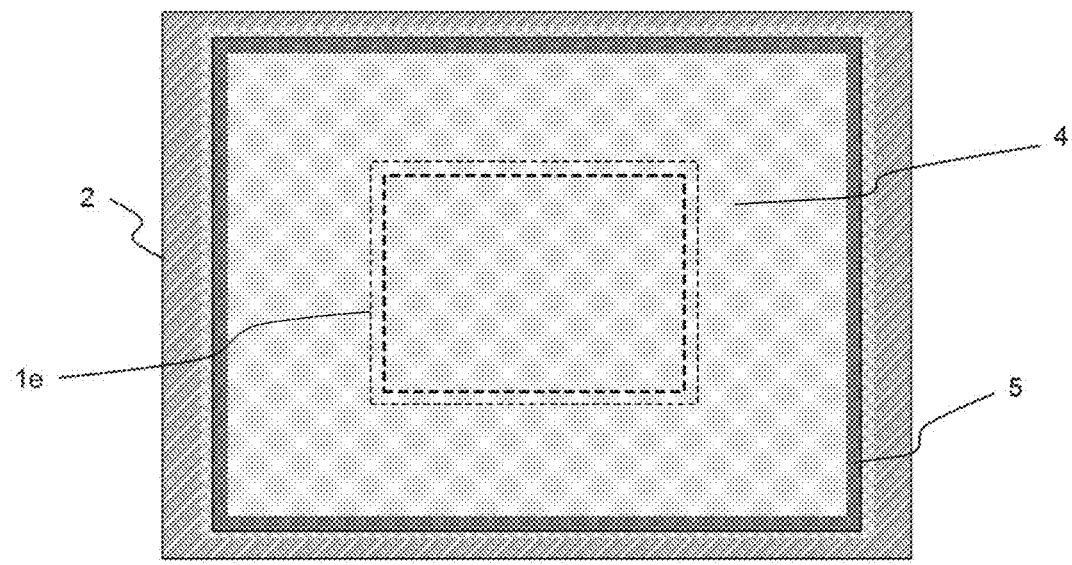
Figure 17B:
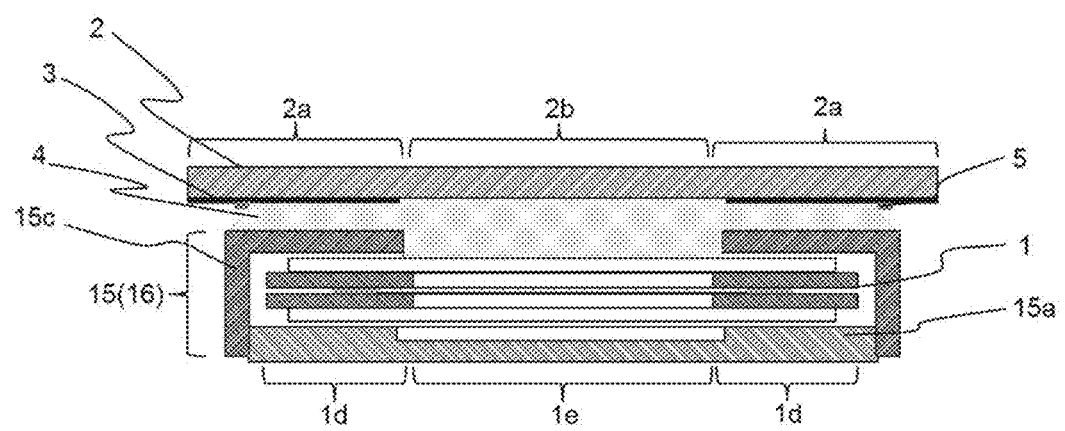
Figure 18:
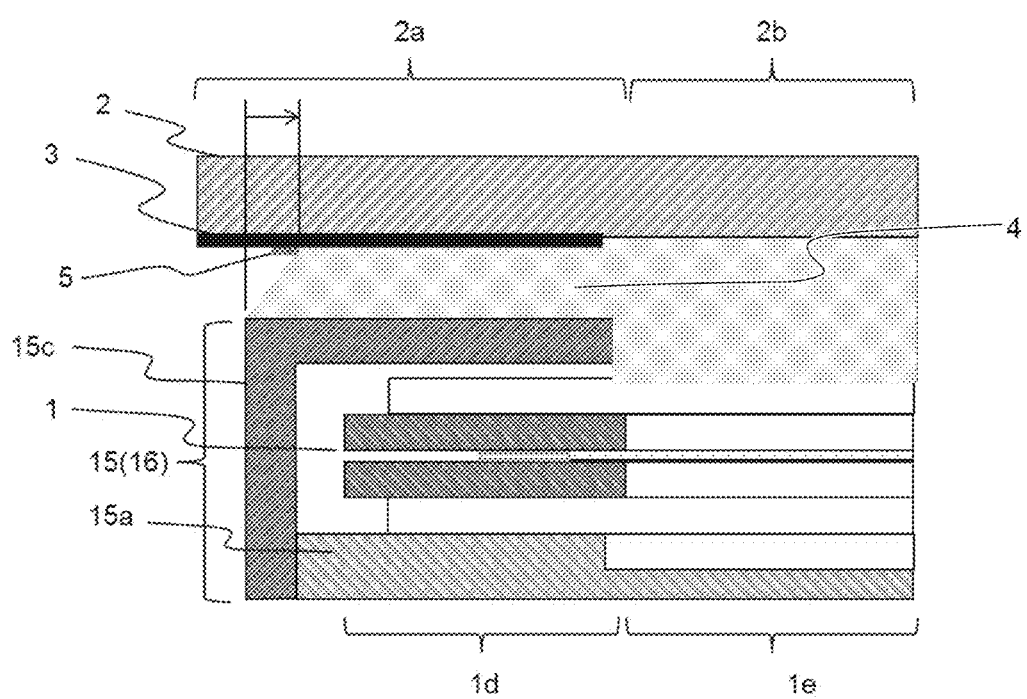
FIG. 18 is a fragmentary enlarged side elevational section of the apparatus of the exemplary embodiment that uses the LCD module as a kind of an image display device for the base unit (the second exemplary embodiment)

FIG. 17A is a plan view showing a structural example of an apparatus that uses an LCD module as a kind of an image display device for a base unit, FIG. 17B is a side elevational section thereof, and FIG. 18 is a fragmentary enlarged sectional view of the apparatus using the LCD module as the base unit.

This embodiment shows an example of a case where a curing resin 4 is cured by UV light 9 irradiated from a side face direction of the gap in the outer circumference of a cover plate 2 and the LCD module 15 in an apparatus in which a base unit 16 using LCD module 15 for the image display region and the cover plate 2 having a light-shielding part 3 are laminated via the whole surfaces thereof by using a curing resin 4.

The base unit 16 is the LCD module 15 which includes: a liquid crystal display panel 1 for displaying images loaded thereon; underneath thereof, a backlight chassis 15a which supplies a light source for display and display signals; and a metal frame 15c for protecting the liquid crystal panel 1 and the backlight chassis 15a.

The structure of the liquid crystal panel 1 is the same as the case of the first exemplary embodiment, so that explanation thereof is omitted.

As shown in FIG. 18, the metal frame 15c of the LCD module 15 is a frame using a metal plate or the like exhibiting a light-shielding characteristic. It is disposed to cover the outer circumference part of the wiring region 1d of the liquid crystal panel and the backlight chassis 15a, and a part corresponding to the display region 1e of the liquid crystal panel 1 is opened.

The material of the molding member 5 is the same as the case of the first exemplary embodiment, so that the explanation thereof is omitted.

The molding member 5 is provided on the cover plate 2 which faces to the gap between the light-shielding region 2a of the cover plate 2 and the metal frame 15c.

In this exemplary embodiment, as shown in FIG. 17A and FIG. 17B, the molding member 5 is provided over the whole circumference of the bottom face of the cover plate 2 which is on the inner side than the external shape of the LCD module 15 when viewed from the above the cover plate 2.

The material of the curing resin 4 is the same as the case of the first exemplary embodiment, so that the explanation thereof is omitted.

A photocurable resin is used for the curing resin 4 that is used for laminating the LCD module 15 and the cover plate 2 having the light-shielding part 3. The photocurable resin is filled up to the outer circumferential end part of the metal frame 15c so that the end part sectional shape of the curing resin 4 comes to be in a tapered shape towards the inner side of the cover plate 2, i.e., to be in a tapered shape expanding to the outer side gradually as the outer circumferential end face of the curing resin 4 leaves away from the cover plate 2.

Next, a curing method of the curing resin 4 in the gap between the cover plate 2 and the LCD module 15 will be described by referring to FIG. 19.

The method for forming the molding member is the same as the method depicted in the first exemplary embodiment, so that the explanation thereof is omitted.

As shown in FIG. 19A, the LCD module 15 as the base unit 16 and the cover plate 2 are laminated by the curing resin 4.

The cover plate 2 and the LCD module 15 are laminated by using a vacuum lamination method. With the lamination, the end part sectional shape of the curing resin 4 is in a tapered shape in which the outer circumferential end face thereof expands gradually towards the outside as becoming distant from the cover plate 2.

Then, as shown in FIG. 19B, the UV light 9 is irradiated to the curing resin 4 in a tapered shape in the gap between the cover plate 2 and the LCD module 15 along the side face direction of the gap from a position on the outer circumference side of the cover plate 2 and the LCD module 15 to partially cure the curing resin 4a in the end part region of the curing resin 4 in the gap of the light-shielding region to tentatively fix the cover plate 2 to the LCD module 15. For example, when the UV light 9 is irradiated from the direction of 180 degrees in a case where the refractive index $n_2$ of the curing resin 4 is 1.51 and the end part sectional shape of the curing resin 4 is in a tapered shape of 60 degrees by taking the state of being in parallel to the surfaces of the cover plate 2 and the LCD module 15 as 0 degree as the reference, the curing resin 4a in the substantially triangular end part region having the face of the end part sectional shape as the oblique side and the face in contact with the surface of the metal frame 15c of the LCD module 15 as the bottom can be cured by the UV light 9 irradiated to the surface of the metal frame 15c in the LCD module 15 by being refracted by the end face of the curing resin 4 (see FIG. 19B). In FIG. 19B, the image of the part cured by the refracted UV light 9 is shown in dark relatively to clearly present the cured part.

That is, the step of tentatively fixing the cover plate 2 to the LCD module 15 is achieved by curing the part 4a of the curing resin in the light-shielding region of the outer circumference part out of the curing resin in the cap between the cover plate 2 and the LCD module 15 through irradiating the UV light towards the gap from the position on the outer side than the outer circumference of the cover plate 2 and the LCD module 15 on a plane including the gap between the cover plate 2 and the LCD module 15.

Then, as shown in FIG. 19C, the UV light 9 is irradiated to from the above the cover plate 2 or from the bottom of the liquid crystal panel 1, i.e., from the position isolated in the normal direction from the plane including the gap between the cover plate 2 and the LCD module 15, to the photocurable resin under the transparent region 2b of the cover plate 2 to cure the curing resin 4c part in the display region. FIG. 19C shows an example of the case where the light is irradiated form the above the cover plate 2.

The curing method of the curing resin 4 in the transparent region 2b is the same as the method depicted in the first exemplary embodiment, so that the explanation thereof is omitted.

Then, as shown in FIG. 19D, the curing resin 4b in the deep part region of the gap between the cover plate 2 and the metal frame 15c of the LCD module 15, i.e., the remaining part of the curing resin 4b that is not cured in the step shown in FIG. 19B even though located in the outer side end part, is cured by the UV light 9. The curing resin 4b in the deep part region can be cured by irradiating the UV light towards the gap in a direction intersecting with the plane that includes the gap between the cover plate 2 and the LCD module 15 from the position on the outer side than the outer circumference of the cove plate 2 and the LCD module 15 in such a manner that the UV light refracted by the end face of the curing resin in the light-shielding region of the outer circumference part becomes in parallel to the gap between the cover plate 2 and the LCD module 15.

Figure 20:
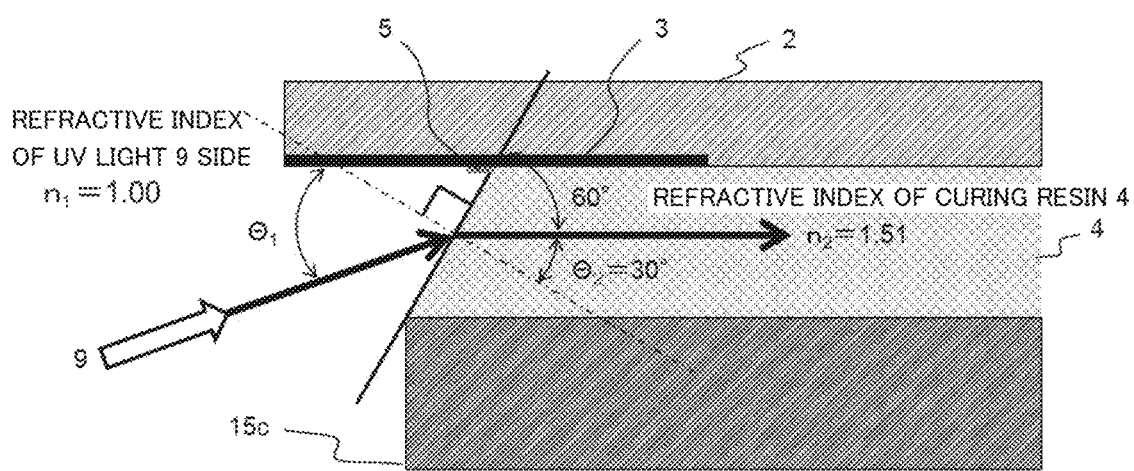
FIG. 20 is a side elevational section showing an example of calculation of the UV light incident angle required for allowing the UV light refracted by the end face of an end part sectional shape to travel in parallel along the gap between the cover plate and a metal frame (the second exemplary embodiment)

For example, in a case where the refractive index $n_2$ of the curing resin 4 is 1.51 and the end part sectional shape of the curing resin 4 is in a tapered shape of 60 degrees by taking the state of being in parallel to the surfaces of the cover plate 2 and the LCD module 15 as 0 degree as the reference, through irradiating the UV light from the direction of 199 degrees, as shown in FIG. 20, it is possible to make the UV light 9 refracted by the end face of the end part sectional shape travel in parallel along the gap so that the curing resin 4b in the deep part region can be cured properly.

$$\theta_1 = \sin^{-1}(n_2 \times \sin \theta_2) = \sin^{-1}(1.51 \times \sin 30°) = 49°$$

$$UV \text{ light 9 incident angle } \theta(°) = \theta_1 + 90° + 60°$$

$$= 49° + 90° + 60° = 199°$$

The arithmetic calculation formula using Snell's formula itself is already known, so that details regarding the calculation processing are not described herein.

As mentioned above, through curing the part 4a of the curing resin in the light-shielding region of the outer circumference part prior to the curing resin 4c in the transparent region of the cover plate 2, it becomes possible to effectively prevent extrusion of the curing resin 4 from the outer circumference part in the curing process.

Figure 21:
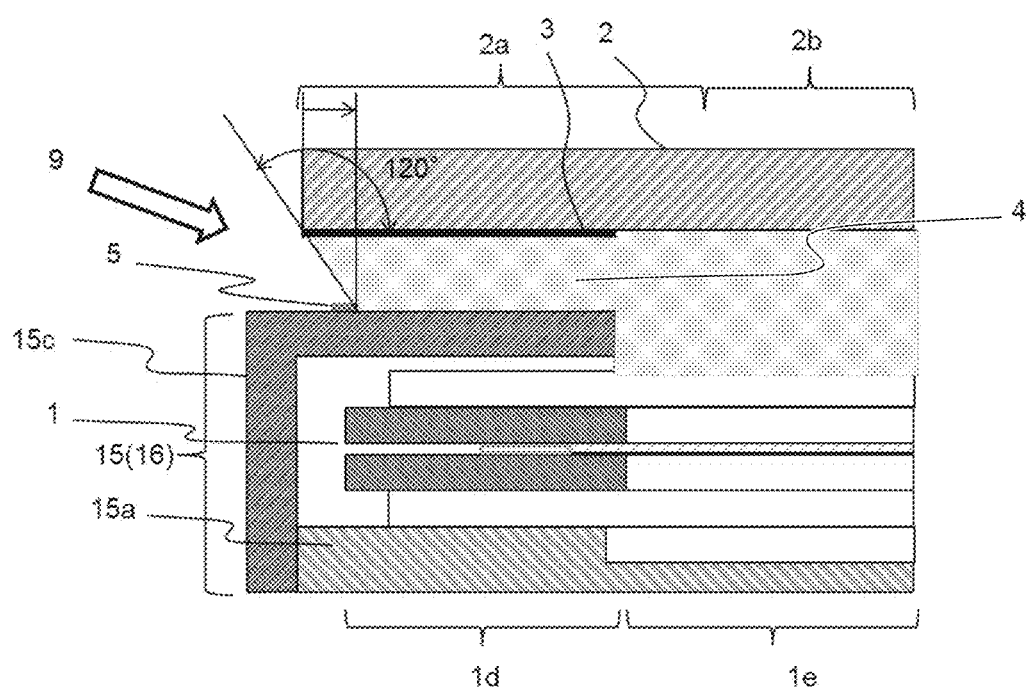
FIG. 21 is a side elevational section showing a structural example of a case where the LCD module is larger than the cover plate (a modification example of the second exemplary embodiment)
Figure 22:
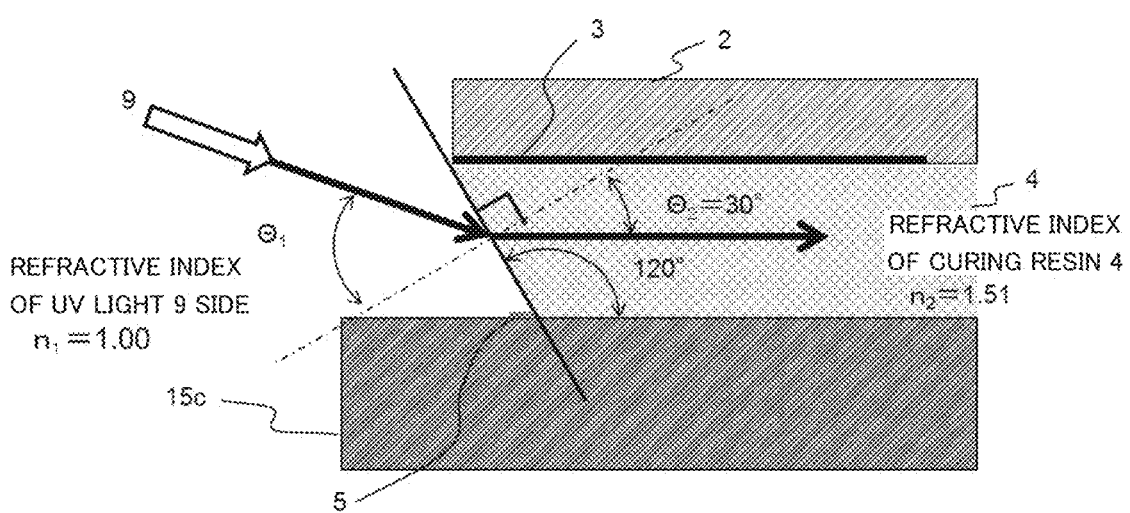
FIG. 22 is a side elevational section showing an example of calculation of the UV light incident angle required for allowing the UV light refracted by the end face of an end part sectional shape to travel in parallel along the gap between the cover plate and a metal frame (a modification example of the second exemplary embodiment)

Herein, the case where the LCD module 15 is smaller than the cover plate 2 is described. However, it is also possible to use the structure in which the LCD module 15 is larger. For example, as shown in FIG. 21, in a case where the molding member 5 is provided to the LCD module 15 and the end part sectional shape of the curing resin 4 is in a tapered shape of 120 degrees, it is possible to make the UV light refracted by the end face of the end part sectional shape travel in parallel along the gap and to cure the curing resin 4b in the deep part region properly through irradiating the UV light 9 from the direction of 161 degrees as shown in FIG. 22.

$$\theta_1 = \sin^{-1}(n_2 \times \sin \theta_2) = \sin^{-1}(1.51 \times \sin 30°) = 49°$$

$$UV \text{ light 9 incident angle } \theta(°) = 180° - \theta_1 + 30°$$

$$= 180° - 49° + 30° = 161°$$

Figure 23:
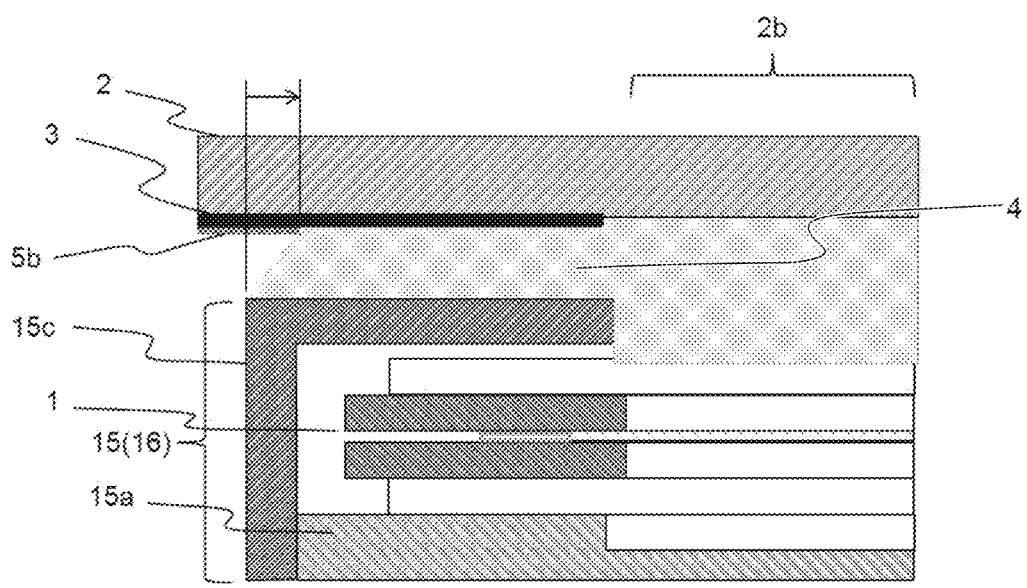
FIG. 23 is a side elevational section showing an example of the structure when using surface processing exhibiting liquid repellency instead of using a molding member (a modification example of the second exemplary embodiment)

This exemplary embodiment is described by referring to the case where the end part section is formed by applying the molding member 5. However, as shown in FIG. 23, it is also possible to achieve it by forming a repellent processing layer 5b by performing surface processing exhibiting liquid repellency to the part of the cover plate 2 facing the gap. For example, the repellent processing layer 5b can be formed by performing coating processing of a material exhibiting liquid repellency, plastic thermal spraying processing, vapor processing, surface reforming for roughing the surface by performing blast processing to the light-shielding part 3 or patterning by using a laser, etc.

Figure 24:
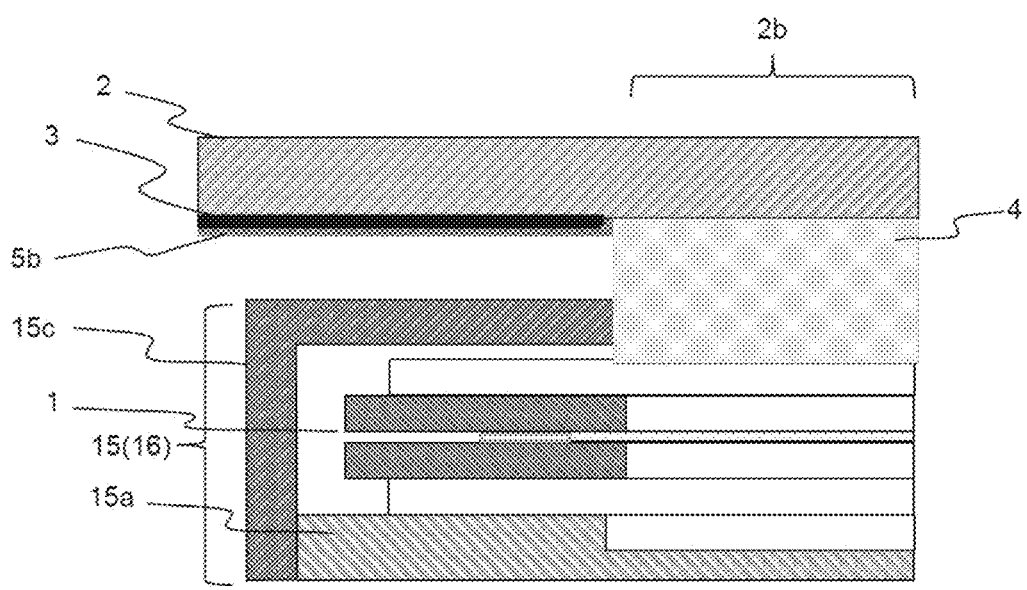
FIG. 24 is a side elevational section showing an example of the structure where a repellent processing layer is formed to cover the surface of the light-shielding part of the cover plate (a modification example of the second exemplary embodiment)

Further, for example, by providing a molding part material (the repellent processing layer 5b) to cover the surface of the light-shielding part 3 of the cover plate 2 as shown in FIG. 24, the repellent processing layer 5b function as a protection film so that deterioration of the light-shielding part 3 can be suppressed.

Figure 25:
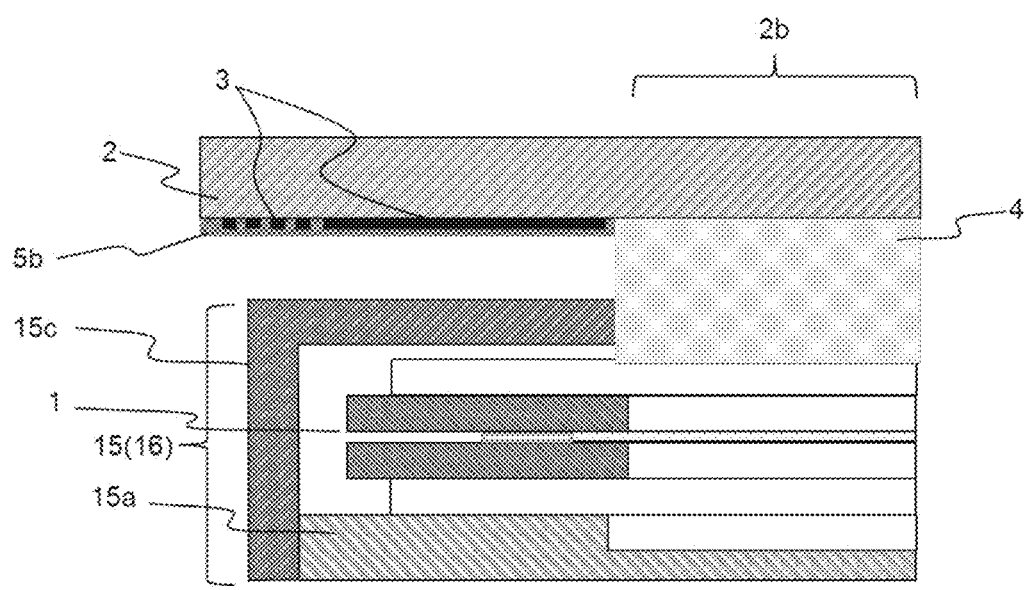
FIG. 25 is a side elevational section showing another example of the structure where a colored repellent processing layer is formed to cover the surface of the light-shielding part of the cover plate which is patterned so that light is transmitted partially (a modification example of the second exemplary embodiment)

Further, in a case where patterning is done so that a part of the light-shielding part 3 of the cover plate 2 transmits the light as shown in FIG. 25, it is possible to add decoration by adding a color to the molding member (the repellent processing layer 5b) that covers the light-shielding part 3.

Figure 26:
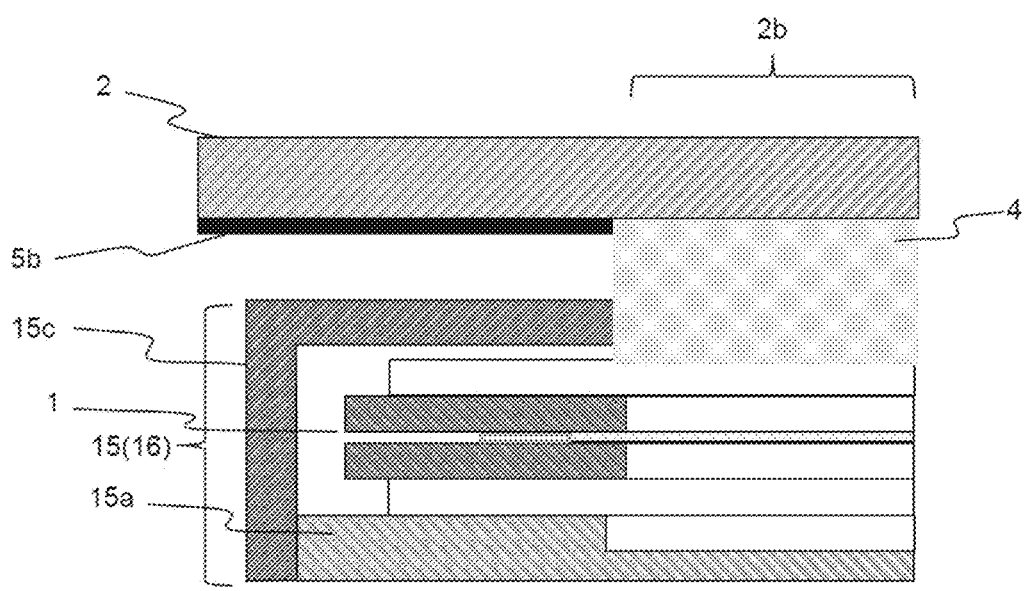
FIG. 26 is a side elevational section showing an example of the structure where a repellent processing layer exhibiting a light-shielding characteristic is also used as the light-shielding part of the cover plate (a modification example of the second exemplary embodiment)

Further, in a case where the repellent processing layer 5b is of a material exhibiting a light-shielding characteristic, it is possible to use the molding member (the repellent processing layer 5b) as the light-shielding part 3 as shown in FIG. 26.

Figure 27:
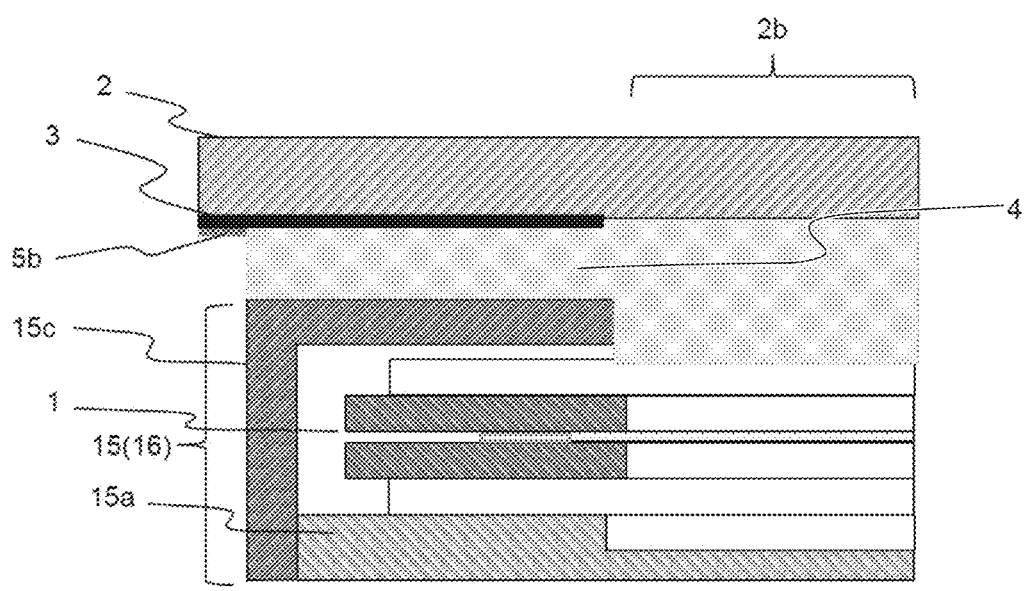
FIG. 27 is a side elevational section showing an example of the structure where the end sectional shape of the curing resin is set to be perpendicular to the face of the cover plate (a modification example of the second exemplary embodiment)

Further, as shown in FIG. 27, it is possible to align the repellent processing layer 5b with the position of the external shape end of the LCD module 15, make the end part sectional shape of the curing resin 4 in a shape perpendicular to the surface of the cover plate 2 on the gap side, and locate the outer circumferential end of the curing resin 4 on the same plane as the outside surface of the metal frame 15c.

Figure 28:
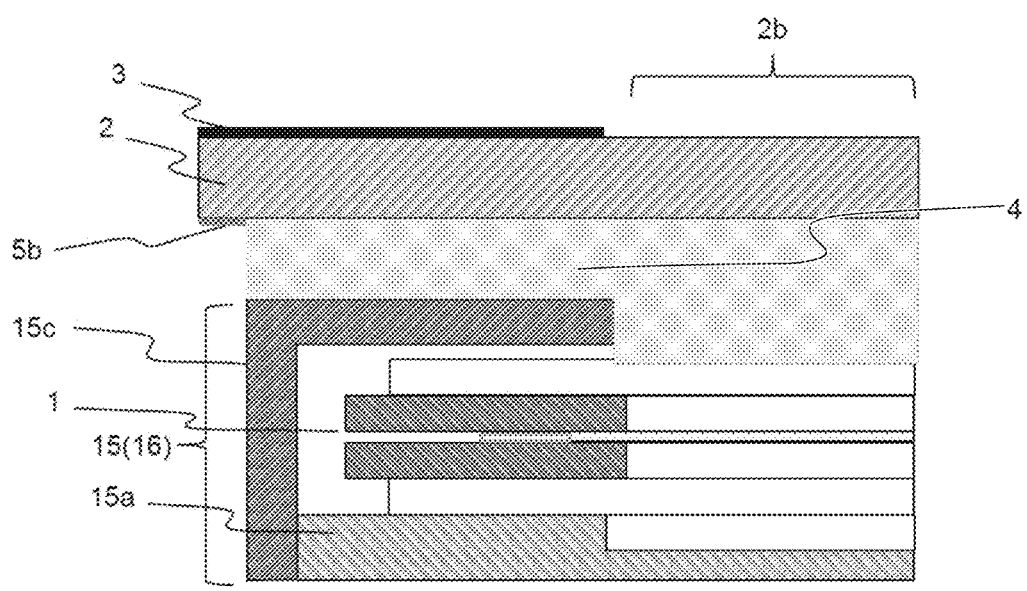
FIG. 28 is a side elevational section showing an example of the structure where the light-shielding part is formed on the surface of the cover plate opposite from the laminating surface (a modification example of the second exemplary embodiment)

Furthermore, as shown in FIG. 28, in a case where the light-shielding part 3 is provided on the opposite surface of the gap (laminating face) between the cover plate 2 and the base unit 16, it is possible to provide the molding member (the repellent processing layer 5b) between the cover plate 2 and the base unit 16.

Figure 29:
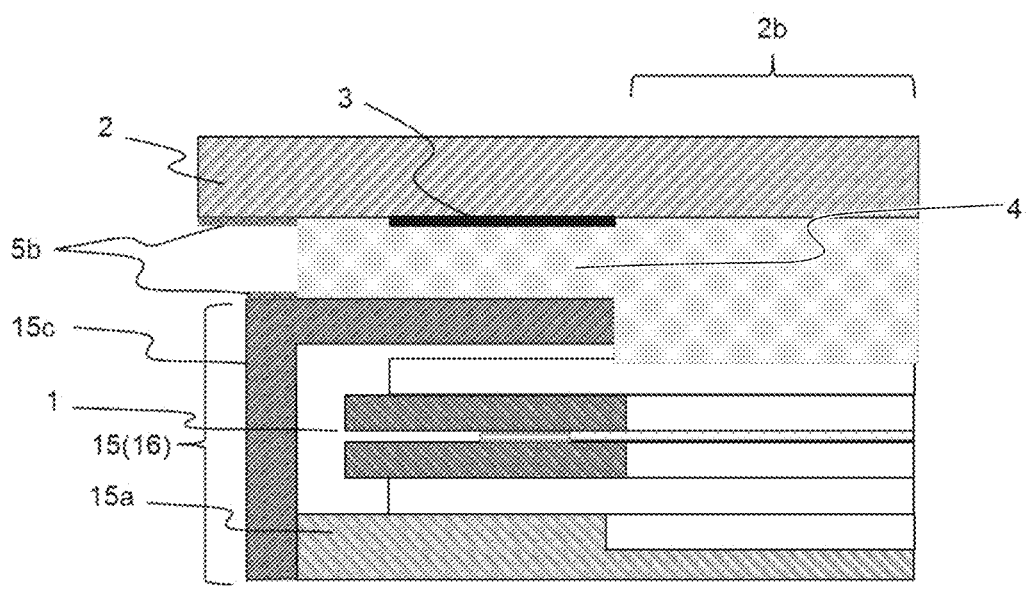
FIG. 29 is a side elevational section showing an example of the structure where a molding member is provided at an outer side position that does not overlap with the light-shielding part (a modification example of the second exemplary embodiment)

Further, as shown in FIG. 29, it is also possible to provide the molding member (the repellent processing layer 5b) in the bottom face of the cover plate 2 at the outside position (the transparent part) which does not overlap with the light-shielding part 3.

Operational Effects of Second Exemplary Embodiment

Next, operational effects related to assembling of the apparatus according to the second exemplary embodiment will be described by referring to FIG. 30.

The apparatus herein is a structure in which the laminated cover plate and the LCD module are mounted into a chassis.

When mounting the display device in which the cover plate 2 is smaller than the LCD module 15 as in the case shown in FIG. 21 into the chassis 17, the positions of the external shape of the LCD module 15 as the base unit 16 and the inner wall of the chassis 17 are aligned, and the laminated cover plate 2 and the LCD module 15 are fitted into the chassis 17 and fixed.

Figure 30A:
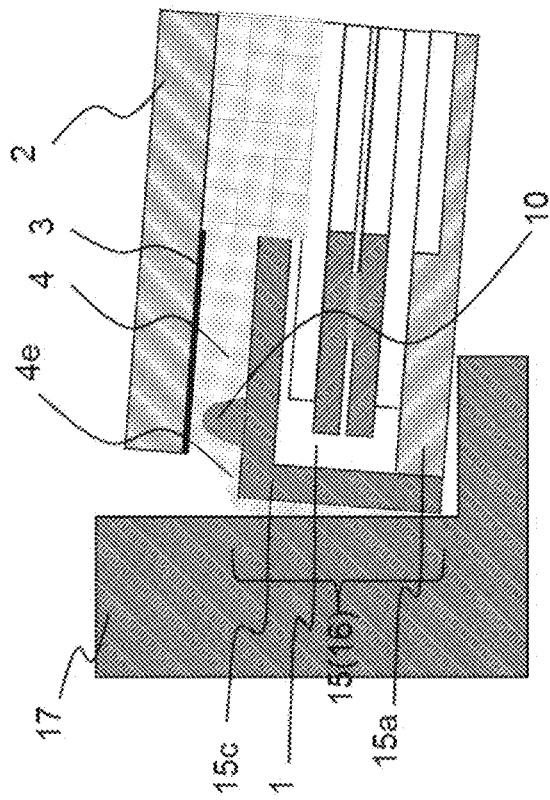

The curing resin 4 stays on the inner circumference side of the LCD module 15 than the position where the molding member 5 is disposed. Thus, as shown in FIG. 30A, positions of the external shape of the LCD module 15 and the inner wall of the chassis 17 can be aligned so that the laminated cover plate 2 and the LCD module 15 can be mounted into the chassis 17 properly.

Further, the curing resin 4 does not contaminate the cover plate 2, the base unit 16, the chassis 17, and the surrounding environment thereof.

Figure 30B:
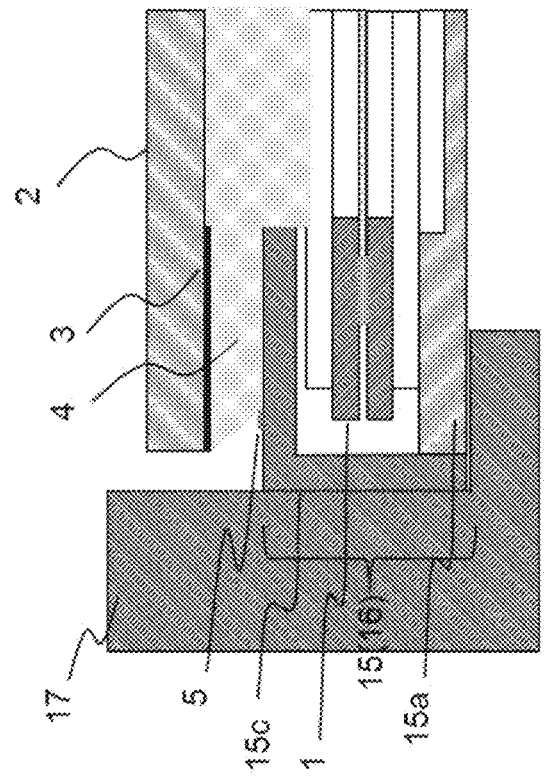
Figure 32:
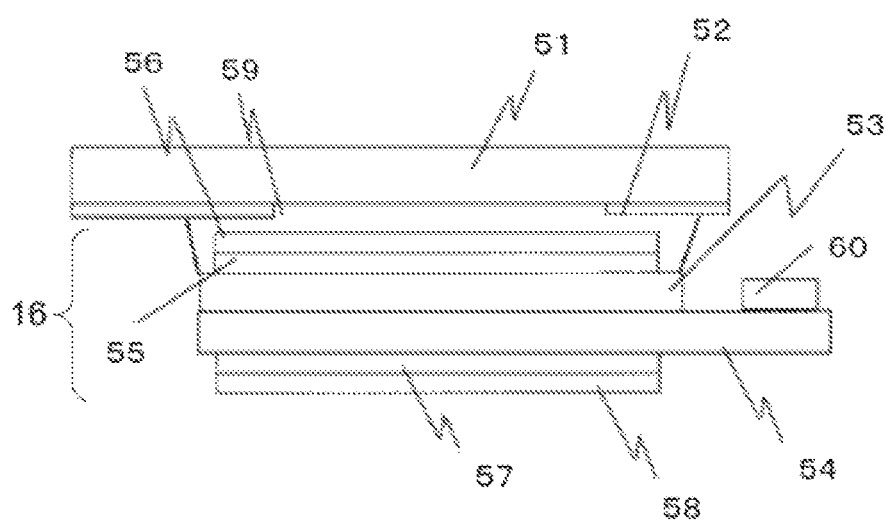
FIG. 32 is a side elevational section showing an example of a known display device in a simplified manner.
Figure 33:
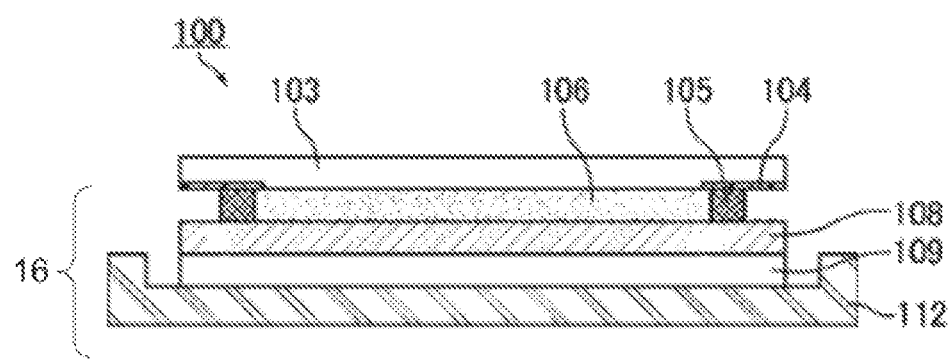
FIG. 33 is a side elevational section showing another example of a known display device in a simplified manner.

In the meantime, in a case where the dam material 10 is provided to the LCD module 15, there is a gap generated between the dam material 10 and the cover plate 2 by the warps of the cover plate 2 and the metal frame 15c of the LCD module 15 and, as shown in FIG. 30B, the curing resin 4 is extruded out from the gap and a curing resin extrusion 4e is formed on the outer side of the dam material 10.

The positions of the LCD module 15 and the inner wall of the chassis 17 cannot be aligned due to the extruded curing resin 4e, so that the laminated cover plate 2 and the LCD module 15 cannot be mounted into the chassis 17 properly. Further, the curing resin 4 contaminates the cover plate 2, the base unit 16, the chassis 17, and the surrounding environment thereof.

With the display device in which the cover plate 2 and the LCD module 15 are laminated, when mounting the display device in which the cover plate 2 is larger than the LCD module 15 as in the case shown in FIG. 17 into the chassis 17, the situation is the same as explained for the first exemplary embodiment by referring to FIG. 15.

Another operational effect of the second exemplary embodiment will be described by referring to FIG. 31.

After the laminating step (see FIG. 19A) as already described, the cover plate 2 and the LCD module 15 in that state receives the UV light 9 irradiated from the position on the outer circumference side of the cover plate 2 and the LCD module 15 to partially cure the curing resin 4a in the end part region out of the curing resin 4 in the gap of the light-shielding region (see FIG. 19B). However, in order to cure the curing resin 4c in the display region, it is necessary to irradiate the UV light 9 further from the above the cover plate 2 (see FIG. 19C). Further, the irradiating directions of the necessary UV light 9 vary for the step of curing the curing resin 4a in the end part region of the curing resin 4 (see FIG. 19B) and the step of curing the curing resin 4c in the display region (see FIG. 19C). Thus, between the step of FIG. 19B and the step of FIG. 19C, there may be cases where it is required to transport the cover plate 2 and the LCD module 15 from a work stage which includes a light source for irradiating the UV light 9 from the position of the outer circumference side of the cover plate 2 and the LCD module 15 (e.g., an UV curing device) to a work stage which includes a light source for irradiating the UV light 9 from the above the cover plate 2 (e.g., an UV conveyor device). Further, in the step of irradiating the UV light 9 from the above the cover plate 2 (see FIG. 19C), there may be a case where a method of irradiating the UV light 9 further while conveying the cover plate 2 and the LCD module 15 (see the paragraph of "Operational Effects of First Exemplary Embodiment").

In the second exemplary embodiment, the curing resin 4a in the end part region of the curing resin 4 in the gap of the light-shielding region is partially cured to tentatively fix the cover plate 2 to the LCD module 15 in the step before transportation and shift of the cover plate 2 and the LCD module 15 becomes necessary, i.e., in the step of FIG. 19B. Thus, even in a case where the cover plate 2 and the LCD module 15 are transported to be shifted from the work stage which includes a light source for irradiating the UV light 9 from the position of the outer circumference side of the cover plate 2 and the LCD module 15 (e.g., an UV curing device) to the work stage which includes a light source for irradiating the UV light 9 from the above the cover plate 2 (e.g., an UV conveyor device), the cover plate 2 and the LCD module 15 can be transported without generating a shift in the laminating positions of those. Further, even in the case where the cover plate 2 and the LCD module 15 are transported by a conveyor when irradiating the UV light 9 from the above the cover plate 2, there is no shift generated in the laminating positions of the cover plate 2 and the LCD module 15.

When transporting the cover plate 2 and the LCD module 15 to a device for curing the transparent region without curing the curing resin 4a of the end part region, it is required to perform a positioning work again between the cover plate 2 and the LCD module 15 before curing the curing resin 4c in the transparent region since the cover plate 2 and the LCD module 15 are not fixed. However, with the second exemplary embodiment, the repositioning work can be omitted.

Further, as shown in FIG. 31A1 and FIG. 31A2, even when the air bubbles 12 are generated at the time of curing the curing resin 4a in the end part region of the gap, the curing resin 4a of the end part region is under the light-shielding part 3 so that the air bubbles 12 cannot be visually recognized from the display region 1e. Therefore, the air bubbles are not considered defective. If it is still desired to achieve tentative fastening by utilizing a part of cured curing resin 4 in the manufacturing method which cures the curing resin 4 by providing the bead-like dam material 10 in the gap, only way is to cure a part of the curing resin 4c in the transparent region such as the curing resin 4c in the fringe part of the transparent region for preventing position shift since the irradiation of the UV light from the side direction is blocked by the dam material 10. However, in such case, when there are the air bubbles 12 at the time of lamination in the curing resin 4f in the display region cured for preventing position shift as shown in FIG. 31B1 and FIG. 31B2, the air bubbles 12 remain in the positions that can be visually recognized from the display region 1e, thereby generating display failures.

Effects of Second Exemplary Embodiment

As in the case of the first exemplary embodiment, the cover plate 2 and the base unit 16 are not easily separated from the curing resin 4 with the second exemplary embodiment. Such an effect that the cover plate 2, the base unit 16, and the surrounding environment thereof are not contaminated can be achieved since the molding member 5 prevents extrusion of the curing resin 4. Also achieved is an effect of making it possible to cut the manufacturing cost such as the material cost for the dam material 10, the manufacturing equipment cost, and the like since the manufacturing process of the dam material 10 is unnecessary.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

While a part of or a whole part of the exemplary embodiments disclosed above can be properly expressed by following Supplementary Notes described below, the mode for embodying the present invention and the technical spirit of the present invention are not limited only to those.

(Supplementary Note 1)

An apparatus which includes a base unit and a cover plate opposing to the base unit being laminated by a curing resin, wherein a molding member for restricting a spread region of the curing resin in a gap sandwiched between the base unit and the cover plate is provided at least in one of opposing surfaces of the base unit and the cover plate.

(Supplementary Note 2)

An apparatus which includes a base unit and a cover plate opposing to the base unit being laminated by a curing resin, wherein a molding member for molding an end part sectional shape of the curing resin in a gap sandwiched between the base unit and the cover plate is provided at least in one of opposing surfaces of the base unit and the cover plate.

(Supplementary Note 3)

The apparatus as depicted in Supplementary Note 1 or 2, which includes a light-shielding part at least in one of the base unit and the cover plate, wherein the molding member is provided on the light-shielding part or at a position corresponding to the light-shielding part.

(Supplementary Note 4)

The apparatus as depicted in Supplementary Note 3, wherein the molding member is provided in an inner circumference end on the light-shielding part.

(Supplementary Note 5)

The apparatus as depicted in Supplementary Note 1 or 2, which includes a light-shielding part at least in one of the base unit and the cover plate, wherein the molding member is provided in an outer side of the light-shielding part.

(Supplementary Note 6) The apparatus as depicted in Supplementary Note 1 or 2, wherein the molding member is provided in an outer circumference end on the base unit.

(Supplementary Note 7)

The apparatus as depicted in Supplementary Note 1 or 2, wherein the molding member exhibits liquid repellency for the curing resin.

(Supplementary Note 8)

The apparatus as depicted in Supplementary Note 1 or 2, wherein the molding member is formed in a thickness of ⅕ or less with respect to the height of the gap between the base unit and the cover plate.

(Supplementary Note 9)

The apparatus as depicted in Supplementary Note 1 or 2, wherein the base unit is an image display device or an input device.

(Supplementary Note 10)

The apparatus as depicted in Supplementary Note 1 or 2, wherein the cover plate is an input device, a substrate, or a composite substrate.

(Supplementary Note 11)

The apparatus as depicted in Supplementary Note 1 or 2, wherein the curing resin has at least one curing function out of a photocurable function, a thermosetting function, and a moisture-curable function.

(Supplementary Note 12)

An apparatus manufacturing method for laminating a base unit and a cover plate opposing to the base unit via a curing resin, which includes:

a step of forming and curing a molding member for restricting a spread region of the curing resin at least in one of opposing surfaces of the base unit and the cover plate (see FIG. 14A);

a step of loading the curing resin on at least one of the opposing surfaces of the base unit and the cover plate, and position-aligning and laminating the base unit and the cover plate (see FIG. 14B);

a step of curing the curing resin in a light-shielding region of an outer circumference part out of the curing resin in a gap between the cover plate and the base unit (see FIG. 14C); and a step of curing an uncured curing resin in a remaining part in a transparent region of the cover plate (see FIG. 14D).

(Supplementary Note 13)

The apparatus manufacturing method as depicted in Supplementary Note 12, wherein a material exhibiting liquid repellency is used for the molding member.

(Supplementary Note 14)

The apparatus manufacturing method as depicted in Supplementary Note 12, wherein:

a photocurable curing resin is used as the curing resin;

the step of curing the curing resin in the light-shielding part of the outer circumference part (see FIG. 14C) is executed by irradiating light towards the gap from an outer side position than the outer circumference of the cover plate and the base unit on a plane including the gap between the cover plate and the base unit; and the step of curing the uncured resin in a remaining part in the transparent region of the cover plate (see FIG. 14D) is executed by irradiating light towards the top face of the cover plate or towards the bottom face of the base unit from a position isolated in the normal direction from the plane including the gap between the cover plate and the base unit.

(Supplementary Note 15)

An apparatus manufacturing method for laminating a base unit and a cover plate opposing to the base unit via a photocurable curing resin, which includes:

a step of forming and curing a molding member for restricting a spread region of the curing resin at least in one of opposing surfaces of the base unit and the cover plate in such a manner that the outer circumferential end face of the curing resin comes to be in a tapered shape which gradually expands towards the outer side as becoming distant from the cover plate or in such a manner that the outer circumferential end face of the curing resin comes to be in a tapered shape which gradually expands towards the outer side as becoming distant from the base unit;

a step of loading the curing resin on at least one of the opposing surfaces of the base unit and the cover plate, and position-aligning and laminating the base unit and the cover plate (see FIG. 19A);

a step of tentatively fixing the cover plate to the base unit by irradiating light towards the gap from the outer side than the outer circumference of the cover plate and the base unit on a plane including the gap between the cover plate and the base unit to cure a part of the curing resin in the light-shielding region of the outer circumference part out of the curing resin in the gap between the cover plate and the base unit by the light refracted by the end face of the curing resin in the light-shielding region of the outer circumference part (see FIG. 19B);

a step of curing an uncured curing resin in a remaining part in the transparent region of the cover plate by irradiating light towards the top face of the cover plate or towards the bottom face of the base unit from a position isolated in the normal direction from the plane including the gap between the cover plate and the base unit (see FIG. 19C); and a step of curing a remaining part of the uncured curing resin in the light-shielding region of the outer circumference part by irradiating light towards the gap in a direction intersecting with the plane including the gap between the cover plate and the base unit from an outer side position than the outer circumference of the cover plate and the base unit in such a manner that the light refracted by the end face of the curing rein in the light-shielding region of the outer circumference part comes to be in parallel to the gap (see FIG. 19D).

(Supplementary Note 16)

An apparatus manufacturing method for laminating a base unit and a cover plate opposing to the base unit via a curing resin, which includes:

a step of forming and curing a molding member for molding an end part sectional shape of the curing resin at least in one of opposing surfaces of the base unit and the cover plate (see FIG. 14A);

a step of loading the curing resin on at least one of the opposing surfaces of the base unit and the cover plate, and position-aligning and laminating the base unit and the cover plate (see FIG. 14B);

a step of curing the curing resin in a light-shielding region of an outer circumference part out of the curing resin in a gap between the cover plate and the base unit (see FIG. 14C); and a step of curing an uncured curing resin in a remaining part in a transparent region of the cover plate (see FIG. 14D).

(Supplementary Note 17)

The apparatus manufacturing method as depicted in Supplementary Note 16, wherein a material exhibiting liquid repellency is used for the molding member.

(Supplementary Note 18)

The apparatus manufacturing method as depicted in Supplementary Note 16, wherein:

a photocurable curing resin is used as the curing resin;

the step of curing the curing resin in the light-shielding part of the outer circumference part (see FIG. 14C) is executed by irradiating light towards the gap from an outer side position than the outer circumference of the cover plate and the base unit on a plane including the gap between the cover plate and the base unit; and the step of curing the uncured resin in a remaining part in the transparent region of the cover plate (see FIG. 14D) is executed by irradiating light towards the top face of the cover plate or towards the bottom face of the base unit from a position isolated in the normal direction from the plane including the gap between the cover plate and the base unit.

(Supplementary Note 19)

An apparatus manufacturing method for laminating a base unit and a cover plate opposing to the base unit via a photocurable curing resin, which includes:

a step of forming and curing a molding member for molding an end part sectional shape of the curing resin at least in one of opposing surfaces of the base unit and the cover plate in such a manner that the outer circumferential end face of the curing resin comes to be in a tapered shape which gradually expands towards the outer side as becoming distant from the cover plate or in such a manner that the outer circumferential end face of the curing resin comes to be in a tapered shape which gradually expands towards the outer side as becoming distant from the base unit;

a step of loading the curing resin on at least one of the opposing surfaces of the base unit and the cover plate, and position-aligning and laminating the base unit and the cover plate (see FIG. 19A);

a step of tentatively fixing the cover plate to the base unit by irradiating light towards the gap from the outer side than the outer circumference of the cover plate and the base unit on a plane including the gap between the cover plate and the base unit to cure a part of the curing resin in the light-shielding region of the outer circumference part out of the curing resin in the gap between the cover plate and the base unit by the light refracted by the end face of the curing resin in the light-shielding region of the outer circumference part (see FIG. 19B);

a step of curing an uncured curing resin in a remaining part in the transparent region of the cover plate by irradiating light towards the top face of the cover plate or towards the bottom face of the base unit from a position isolated in the normal direction from the plane including the gap between the cover plate and the base unit (see FIG. 19C); and a step of curing a remaining part of the uncured curing resin in the light-shielding region of the outer circumference part by irradiating light towards the gap in a direction intersecting with the plane including the gap between the cover plate and the base unit from an outer side position than the outer circumference of the cover plate and the base unit in such a manner that the light refracted by the end face of the curing resin in the light-shielding region of the outer circumference part comes to be in parallel to the gap (see FIG. 19D).

INDUSTRIAL APPLICABILITY

The present invention can be applied to various kinds of apparatuses having a structure in which a base unit and a cover plate are laminated by a curing resin. For example, the present invention can be applied to various kinds of apparatuses which include an image display device such as a liquid crystal display device or an input device such as a touch panel as a base unit.

What is claimed is:

1. An apparatus, comprising:
   a base unit;
   a cover plate opposing to the base unit;
   a photocurable curing resin sandwiched between the base unit and the cover plate; and
   a respective molding member provided, in each one of both opposing surfaces of the base unit and the cover plate, at a position in contact with an outer circumferential end face of the photocurable curing resin in a gap sandwiched between the base unit and the cover plate, the molding members exhibiting liquid repellency for the photocurable curing resin, a thickness of each of the molding members being ⅕ or less than a height of the gap which is in a range of 0.1 mm to 0.5 mm,
   wherein the outer circumferential end face of the curing resin tapers across the thickness of the photocurable curing resin.

2. The apparatus as claimed in claim 1, further comprising a light-shielding part at least in one of the base unit and the cover plate,
   wherein one of the molding members is provided on the light-shielding part or at a position corresponding to the light-shielding part.

3. The apparatus as claimed in claim 2, wherein at least one of the molding members is provided in an inner circumference end on the light-shielding part.

4. The apparatus as claimed in claim 1, further comprising a light-shielding part at least in one of the base unit and the cover plate,
   wherein one of the molding members is provided in an outer side of the light-shielding part.

5. The apparatus as claimed in claim 1, wherein at least one of the molding members is provided in an outer circumference end on the base unit.

6. The apparatus as claimed in claim 1, wherein the base unit is an image display device or an input device.

7. The apparatus as claimed in claim 1, wherein the cover plate is an input device, a substrate, or a composite substrate.

8. The apparatus as claimed in claim 1, wherein the molding member of the cover plate side and the molding member of the base unit side are disposed such that both of the molding members do not overlap with each other when viewed from normal direction of the surfaces of the cover plate and the base unit.

9. A method for laminating the base unit and the cover plate of the apparatus of claim 1, the method comprising:
   forming and curing at least one of the molding members for restricting a spread region of the photocurable curing resin at least in one of opposing surfaces of the base unit and the cover plate;
   loading the photocurable curing resin on at least one of the opposing surfaces of the base unit and the cover plate, and position-aligning and laminating the base unit and the cover plate;
   curing the photocurable curing resin in the gap between the cover plate and the base unit; and
   curing the photocurable curing resin in a transparent region of the cover plate.

10. The method as claimed in claim 9, further comprising after the laminating the base unit and the cover plate, curing a part of the photocurable curing resin in the gap between the cover plate and the base unit.

11. A method for laminating the base unit and the cover plate of the apparatus of claim 1, the method comprising:
    forming and curing at least one of the molding members for molding an end part sectional shape of the photocurable curing resin at least in one of opposing surfaces of the base unit and the cover plate;
    loading the photocurable curing resin on at least one of the opposing surfaces of the base unit and the cover plate, and position-aligning and laminating the base unit and the cover plate;
    curing the photocurable curing resin in the gap between the cover plate and the base unit; and
    curing the photocurable curing resin in a transparent region of the cover plate.

12. The method as claimed in claim 11, further comprising after the laminating the base unit and the cover plate, curing a part of the photocurable curing resin in the gap between the cover plate and the base unit.

* * * * *